(12) United States Patent
Stonoha et al.

(10) Patent No.: US 8,844,829 B1
(45) Date of Patent: Sep. 30, 2014

(54) METHOD OF USING A RFID PORTAL CONTAINING A RFID READER, RFID ANTENNA AND COMPUTER PROCESSOR

(75) Inventors: Joseph R. Stonoha, Fairfield, CT (US); Jozsef Megyola, Naugatuck, CT (US)

(73) Assignee: Netc L.L.C., Trumbull, CT (US)

( * ) Notice: Subject to any disclaimer, the term of this patent is extended or adjusted under 35 U.S.C. 154(b) by 678 days.

(21) Appl. No.: 12/768,393

(22) Filed: Apr. 27, 2010

Related U.S. Application Data

(63) Continuation-in-part of application No. 12/411,668, filed on Mar. 26, 2009.

(60) Provisional application No. 61/257,611, filed on Nov. 3, 2009, provisional application No. 61/152,806, filed on Feb. 16, 2009.

(51) Int. Cl.
 *G06K 19/06* (2006.01)
(52) U.S. Cl.
 USPC ......................................................... 235/492
(58) Field of Classification Search
 USPC ......................................................... 235/492
 See application file for complete search history.

(56) References Cited

U.S. PATENT DOCUMENTS

| | | | | |
|---|---|---|---|---|
| 7,538,676 B2 * | 5/2009 | Branigan et al. | ............ | 340/572.1 |
| 7,656,273 B2 * | 2/2010 | Ehrman et al. | ............... | 340/10.1 |
| 2006/0250249 A1 * | 11/2006 | Cheng | .......................... | 340/572.4 |
| 2007/0118757 A1 * | 5/2007 | Skinner et al. | ................. | 713/186 |
| 2009/0085738 A1 * | 4/2009 | Darianian et al. | ........ | 340/539.11 |
| 2009/0289793 A1 * | 11/2009 | Morin | ......................... | 340/572.1 |

* cited by examiner

*Primary Examiner* — Michael G Lee
*Assistant Examiner* — David Tardif
(74) *Attorney, Agent, or Firm* — Day Pitney LLP

(57) ABSTRACT

A method for tracking the removal of items from a storage area, substantially each item within said storage area including an RFID tag or being part of a manifest of items containing at least one item that includes an RFID tag, each tag containing a unique electronic ID for identifying each respective item, the method including the step of providing a Portal at an egress location for the storage area, the Portal including a computer processor and being capable of activating and reading each proximate RFID tag. The Portal performing the steps of scanning for items with RFID tags, which are proximate to the Portal; activating each RFID tag for each item proximate to the Portal; reading each electronic ID for each proximate item; determining whether the proximate item are on a predetermined manifest; and providing visual indicator and/or electronic communication based on the determination step.

20 Claims, 29 Drawing Sheets

244

| Manifests | Seen | Total | Missing 1 | Free To Pass 1 |
|---|---|---|---|---|
| M20090902_1026 | 20 | 20 | W01009 | CASE10 |
| Free To Pass | 1 | 5 | | |
| M20090902_0656 | 9 | 10 | | |
| Operators | 2 | 116 | | |

Operator(s): OPERATOR09, OPERATOR05

Inventory Tags | Manifest Manager | OverRide | Status: RUNNING

All Missing Tags — 244

METHOD OF USING A RFID PORTAL
CONTAINING A RFID READER, RFID
ANTENNA AND COMPUTER PROCESSOR

This application claims priority to U.S. Provisional Patent Application No. 61/257,611, filed on Nov. 3, 2009, titled "RFID Portal" and U.S. patent application Ser. No. 12/411,668, filed on Mar. 26, 2009, titled "Label With RFID Tag" (the '668 application), which claimed priority to U.S. Provisional Patent Application No. 61/152,806, filed Feb. 16, 2009, having the same title as the '668 application, the specification of each of which is incorporated herein by reference.

BACKGROUND

1. Field of the Invention

The Invention relates to storage tracking and specifically for tracking data storage cartridges which have been provided with labels containing identifying RFID tags.

2. Background of the Invention

Financial institutions, such as J.P. Morgan Chase, store client and related information on individual storage tapes cartridges. An example of such a cartridge is an IBM 3592, part number 23R9830.

The cartridges are stored in individual storage libraries. Each library is essentially a room having storage racks, each rack having an array of individual bins. The racks line one or more walls in rectangular rooms or extend around the single wall in cylindrical rooms. Each library can store thousands of cartridges and an institution can have tens of libraries in a single location.

The cartridges are individually slid into each bin so that a rear edge is visually accessible for identification purposes.

To identify each tape, the rear edge has a label 10, such as illustrated in FIG. 1, which contains a human readable portion 12 and a matching barcode portion 14. The human readable portion 12 includes eight text boxes which are positioned adjacent to each other along the length of the label 10. The text boxes are positioned widthwise adjacent to corresponding barcode digits and quiet zones 16, 18 disposed at opposing lengthwise ends of the barcode digits and which contain no information.

In FIG. 1, the text box 12 includes the following information: "LTO-005" (hyphen added) and "L3". The data "LTO005" represents the volume serial number (VolSer) and is typically 6 characters in length. This is usually a unique string within an organization that identifies the tape. The "L3" represents media identifier. In this example the 'L' represents the technology, in this case LTO, and the '3' represents the generation. Other known types include DLT, AIT, SAIT, 3592, 9840/9940, T10K just to name a few.

The base, starting number, increment value, and increment direction (increment as compared to decrement) are all modifiable variables. The use of six characters for the "LTO005" text grouping is also modifiable. For example, the label could have been assigned with five characters, and would have read "LTO05". In this case, as an example, it is "LTO005" but it can be anything within the "Code 39 Barcode Character Set" standard.

In libraries, not illustrated, individual robot arms contain scanners capable of reading each barcode. Accordingly, when directed, robots are capable of finding and retrieving a specific cartridge. Each library has "cartridge decks". Cartridge decks are readers/writers in which the retrieved cartridges are placed by the robot. The robot also removes cartridges from the cartridge decks and replaces the cartridges back in the storage bins.

Cartridges, individually or in batches, as provided in a predetermine manifest, are regularly removed from or added to individual libraries by employees. Tracking of the cartridges can be performed by having the employee sign a form or editing a database on a computer. The employee reads the human readable portion of the label and inserts the information in a predetermined location. Such tracking is time consuming and may become incomplete due to human error. For example, the employee could improperly transcribe the identifiers or can forget to update forms or databases. Accordingly, a more efficient means for tracking the cartridges is necessary.

SUMMARY OF THE DISCLOSURE

A method for tracking the removal of items from a storage area, substantially each item within said storage area including an RFID tag or being part of a manifest of items containing at least one item that includes an RFID tag, each tag containing a unique electronic ID for identifying each respective item, the method including the step of providing a Portal at an egress location for the storage area, the Portal including a computer processor and being capable of activating and reading each proximate RFID tag. The Portal performing the steps of scanning for items with RFID tags, which are proximate to the Portal; activating each RFID tag for each item proximate to the Portal; reading each electronic ID for each proximate item; determining whether the proximate item are on a predetermined manifest; and providing visual notification based on the determination step.

BRIEF DESCRIPTION OF THE FIGURES

It is to be understood that the following drawings depict details of only typical embodiments of the invention and are not therefore to be considered to be limiting of its scope, and in particular:

FIG. 19 illustrates another user interface for operating the Portal;

FIG. 20 illustrates another user interface for operating the Portal;

FIG. 21 illustrates another user interface for operating the Portal;

DETAILED DESCRIPTION OF THE INVENTION

In an effort to more efficiently track data tapes, the '668 application suggests a novel tape label 10. The label includes a passive RFID tag 20, the key aspects of which are summarized herein for facilitating the discussion of the present invention.

Figure 1:
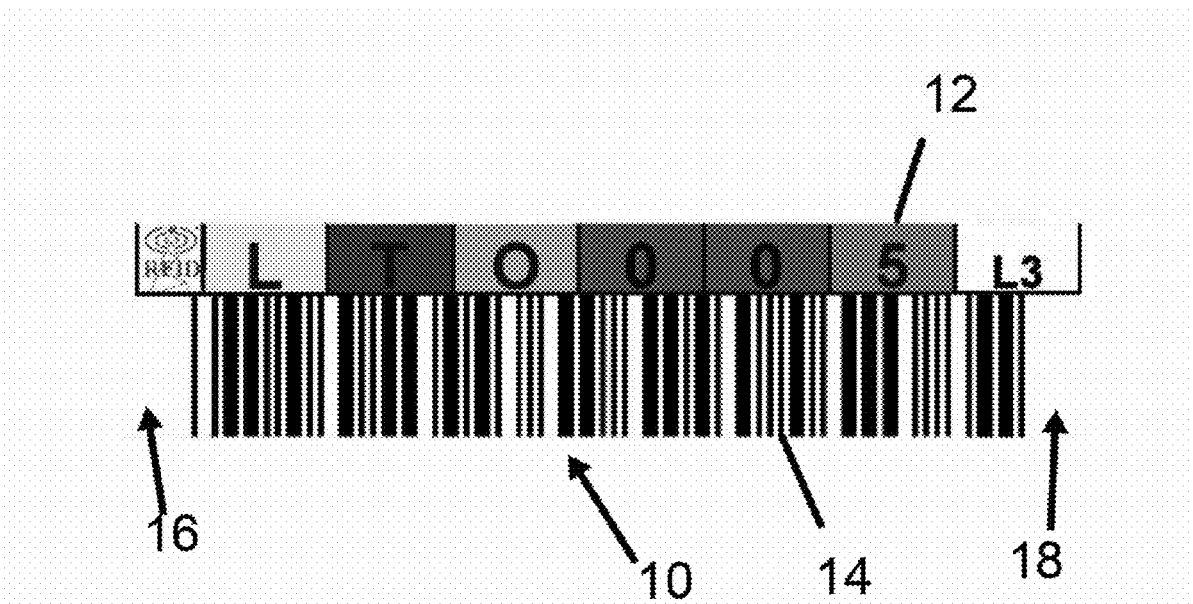
FIG. 1 illustrates a label which can be applied to a data cartridge.
Figure 2:
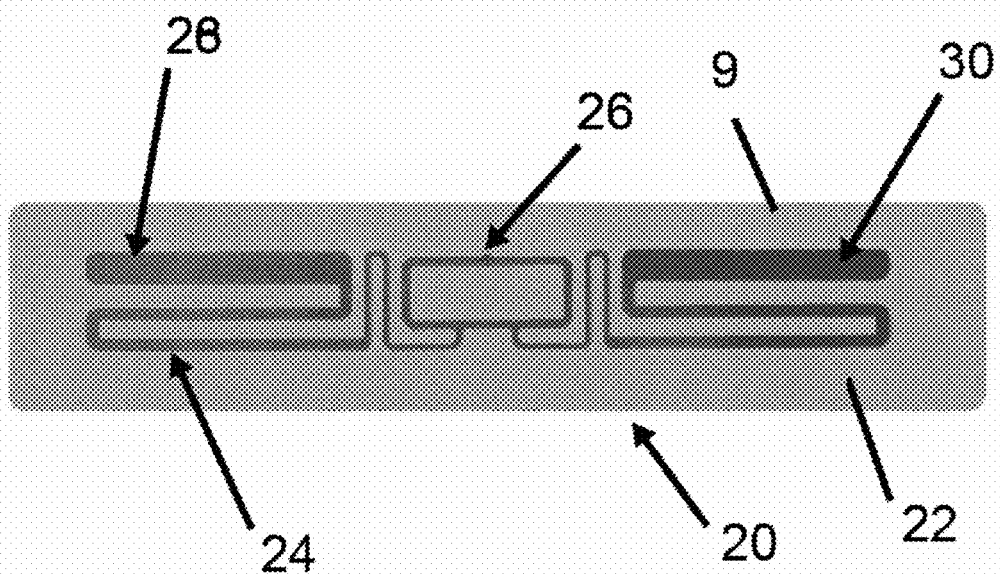
FIG. 2 illustrates an RF powered tag which can be positioned between the label and the data cartridge.

The tag 20, illustrated in FIG. 2, includes a PET substrate 22, which is adhered to the back of a label and itself contains an adhesive to enable the label 10 to adhere to a tape. The substrate 22 is sized to fit within the perimeter of the label 10.

The tag 10 includes an aluminum or copper antenna 24, and an IC chip 26. An example of a suitable IC chip 26 is EPCglobal Class 1, Generation 2 (Gen2) (C1 G2) 1.2.0 compliant, G2XM chip by NXP, which covers the UHF frequency band from 840 to 960 MHz. The IC chip 26 is positioned symmetrically lengthwise between opposing antenna leads 28, 30, but asymmetrically widthwise. Accordingly, the chip is spaced from the barcode portion 14 and, e.g., behind the human readable portion 12 of the label 10. The benefits of this tag are disclosed in detail in the '668 application.

Figure 3:
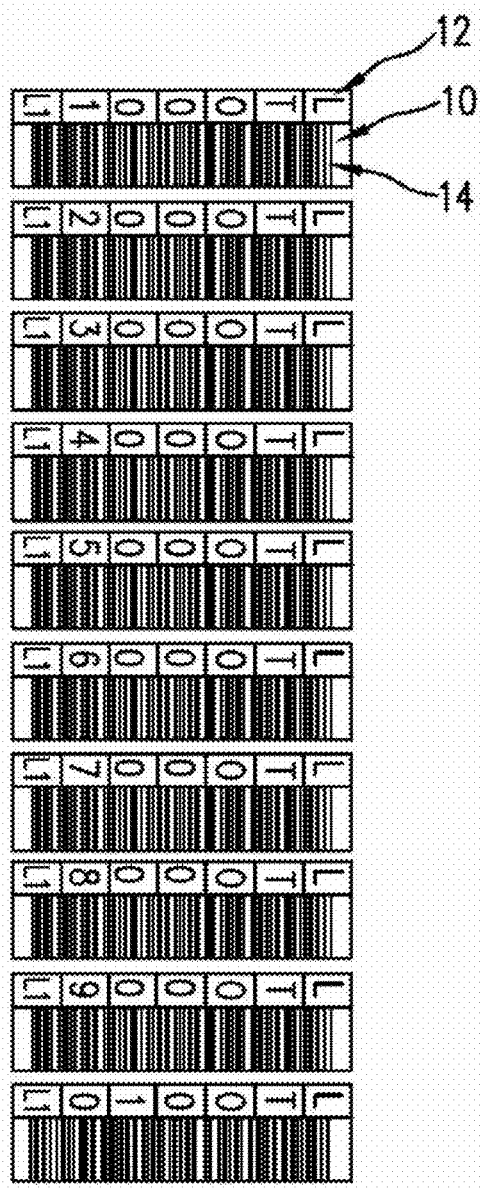
FIG. 3 illustrates ten labels which can be scanned by the inventive system.

A sample series of ten prepared labels is provided in FIG. 3. The process of coding the labels is provided in the '668 patent, though various points are summarized herein.

Each of the ten tags 20, disposed under each of the ten labels in FIG. 3, has a serial number, e.g., from the sequence A1-A10. The labels 10 are illustrated in consecutive order, with label LTO-001 (hyphen added) mated with tag serial number A1 and label LTO-010 mated with tag serial number A10.

Figure 4:
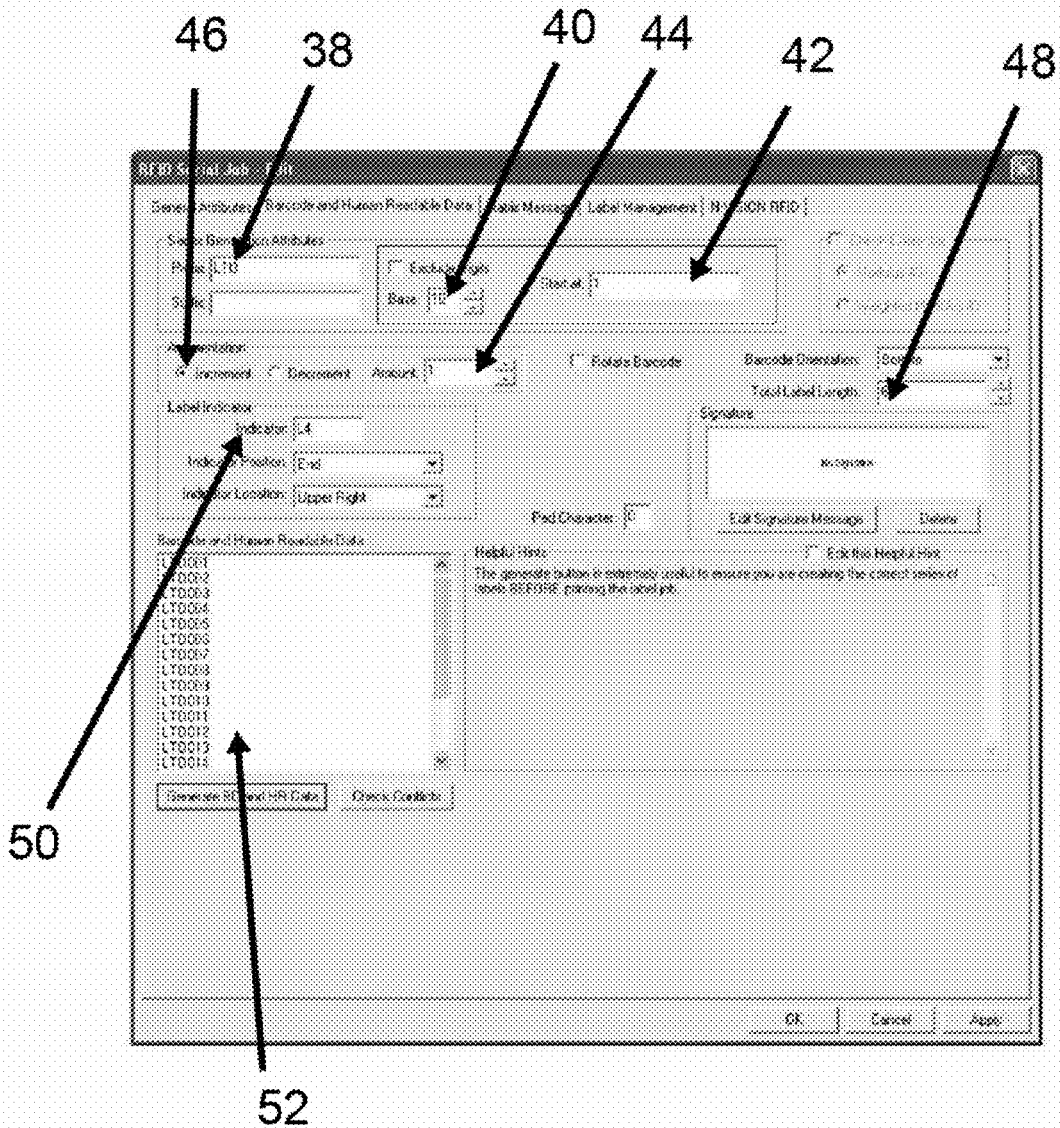
FIG. 4 illustrates one user interface for the programming of the tags.
Figure 5:
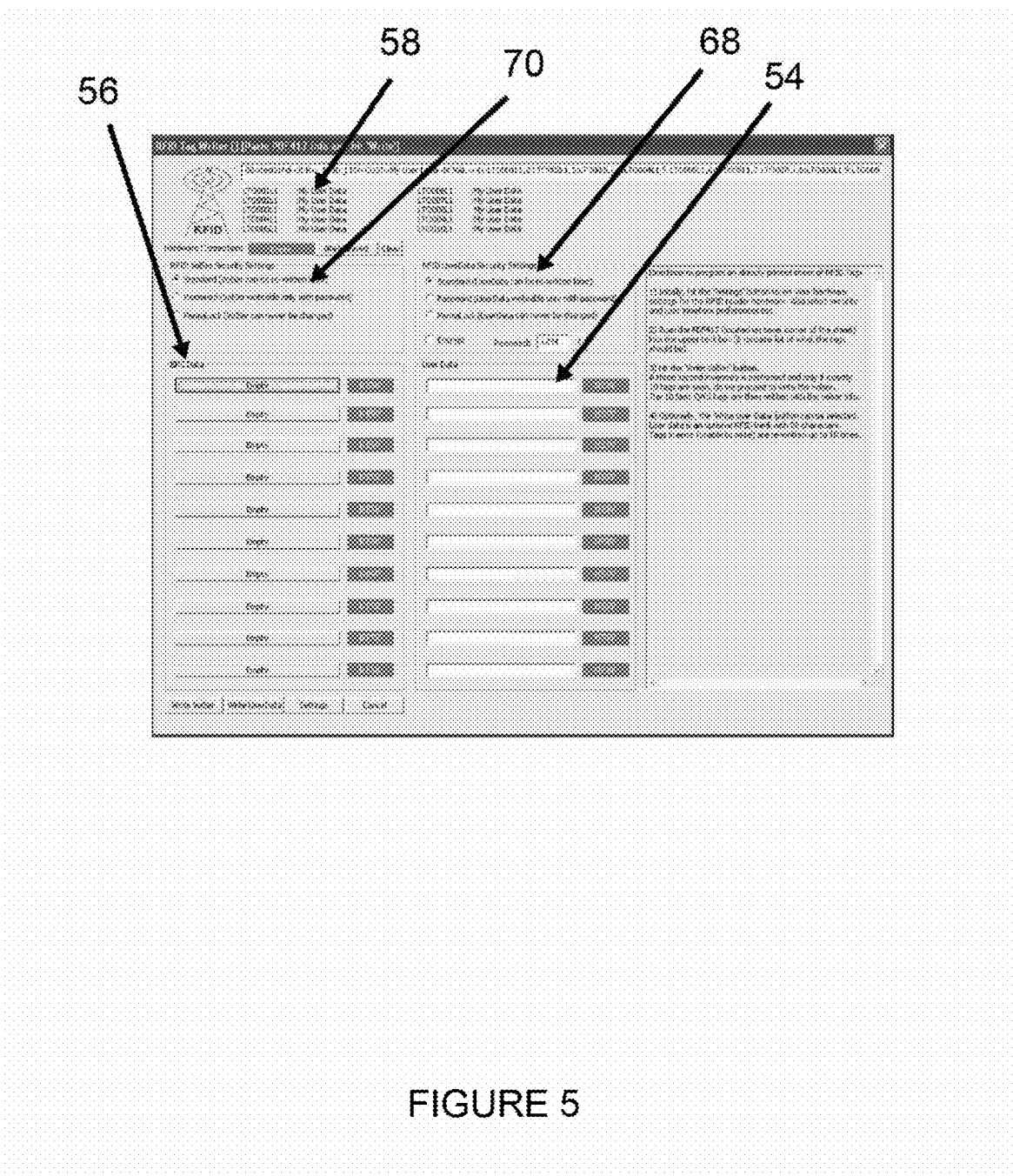
FIG. 5 illustrates another user interface for the programming of the tags.
Figure 6:
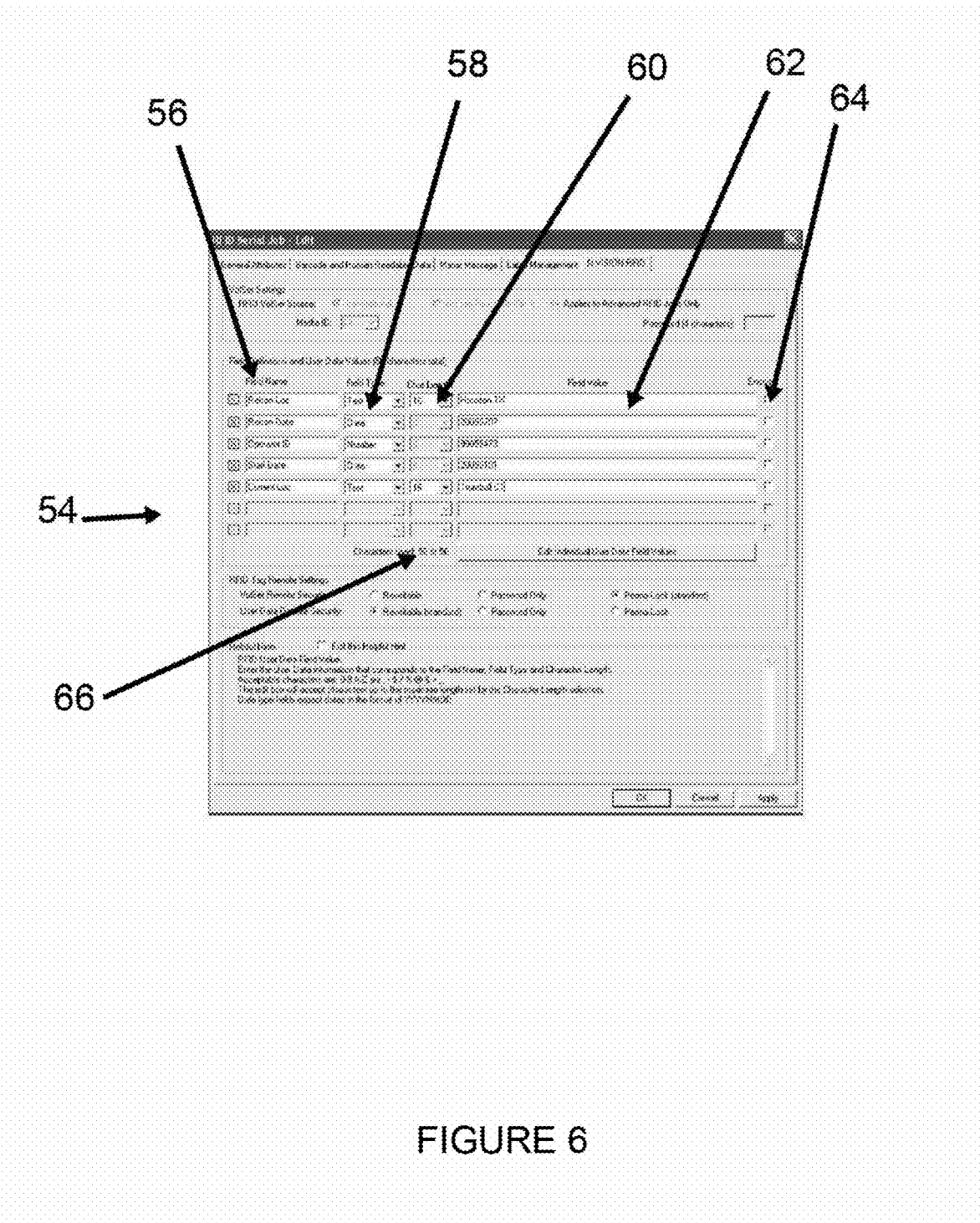
FIG. 6 illustrates a third user interface for programmed tags.

The chips have been programmed using software, having the interface illustrated in FIGS. 4-6.

In FIG. 4, a user input screen provides fields for inputting the VolSer information, including the label type 38 (e.g., "LTO"), base 40 (e.g., "10"), series starting number 42 (e.g., "1"), increment value 44 (e.g., "1"), increment direction 46 (increment vs decrement), number of text digits in on the label 48 (e.g., "6," three for "LTO" and three for the sequence number, such as "001"), and media identifier 50 (e.g., "L3", "L4", etc.).

The number of labels required for the job is requested on another screen (not shown) but in the alternative may be presented on this screen. Using this information, barcode data field 52 automatically generated and displayed for the user to see.

FIG. 5 illustrates a subsequent user input screen in the programming process. The barcode data 52 is referenced in the top of the screen. Other input fields include user data fields 54 and EPC (electronic product code) data fields 56 which can also be input and written to each IC chip 26. EPC data can include typical types of information about the company using the cartridge or information specific to the cartridge.

User data 54, illustrated in FIG. 6, can include anything deemed important about the tapes on which the labels will be placed. By default, the information on this screen would be copied to each of the ten tags 20 and the user could edit each field on a tag by tag basis.

There are seven segments, or rows, of user data which can be populated on each chip. Only five of the seven are utilized in the example, as indicated by the "X" in the left column. Each row has a "field name" identifier 56, a "field type" identifier 58, a "character length" counter 60 and a "field value" input field 62, and a field 64 identifying whether each individual row of user data was encrypted to restrict visual access. The following is provided in the illustrated example:

| Field Name | Field Type | Char Length | Field Value |
| --- | --- | --- | --- |
| Return Loc | Text | 16 | Houston TX |
| Return Date | Date | 8 | 20090707 |
| Operator ID | Number | 8 | 99856473 |
| Start Date | Date | 8 | 20090101 |
| Current Loc | Text | 16 | Trumbull CT |

The "field name" and "field value" data are set by the user. The "field type" identifier 58 is one of "text", "date" or "number." The "character length" counter is a multiple of eight (8) and represents the number of characters in the "field value" input field.

In the example, date and number fields are limited to eight (8) characters in the "field value" input field. An example of a date field is "20100101" (year, month, day) and an example of a number field is an employee identification number (illustrated as "99856473"). As illustrated in the figure, the "char length" field for the "date" and "number" character types is a grayed out font, because it is not user modifiable.

A text field can have multiples of eight (8) characters in the "field value" input field. That is, if the "field value" is populated with seven (7) characters, it will be allotted eight (8) character spaces, with one character unused. On the other hand, if the "field value" is populated with seventeen (17) characters, it is allotted twenty four (24) character spaces, with seven (7) characters unused.

In the illustration, the top field is a text field, titled "Return Loc", where the "field value" input field is populated with "Houston Tex." This "field value" input field requires nine characters, so the field is allotted sixteen (16) character spaces, with seven (7) characters unused.

Each IC chip has a memory bank which can store up to (56) characters in all of the utilized "field value" input fields, which are counted in the "char length" field. A counter 66 provides visual indication of the characters utilized which, in the illustration, is (56) (i.e., all available).

Furthermore, for each of the ten tags 20, the user can specify user data security settings 68 and VolSer security settings 70. Sample settings include "no password" for rewriting, "password required" for rewriting, or PermaLock. The security settings can be set for the label volume/serial numbers and for the user data.

Accordingly, the information written to the tags includes the volume and serial number information for the cartridges corresponding to information printed on the labels, and the user data input into the user controlled software. This enables the cartridges to be automatically tracked when transported into/out of storage libraries and elsewhere.

The disclosure will now turn to a novel inventory tracking system, where each tape in a library contains programmed tags of the types disclosed above.

Figure 7:
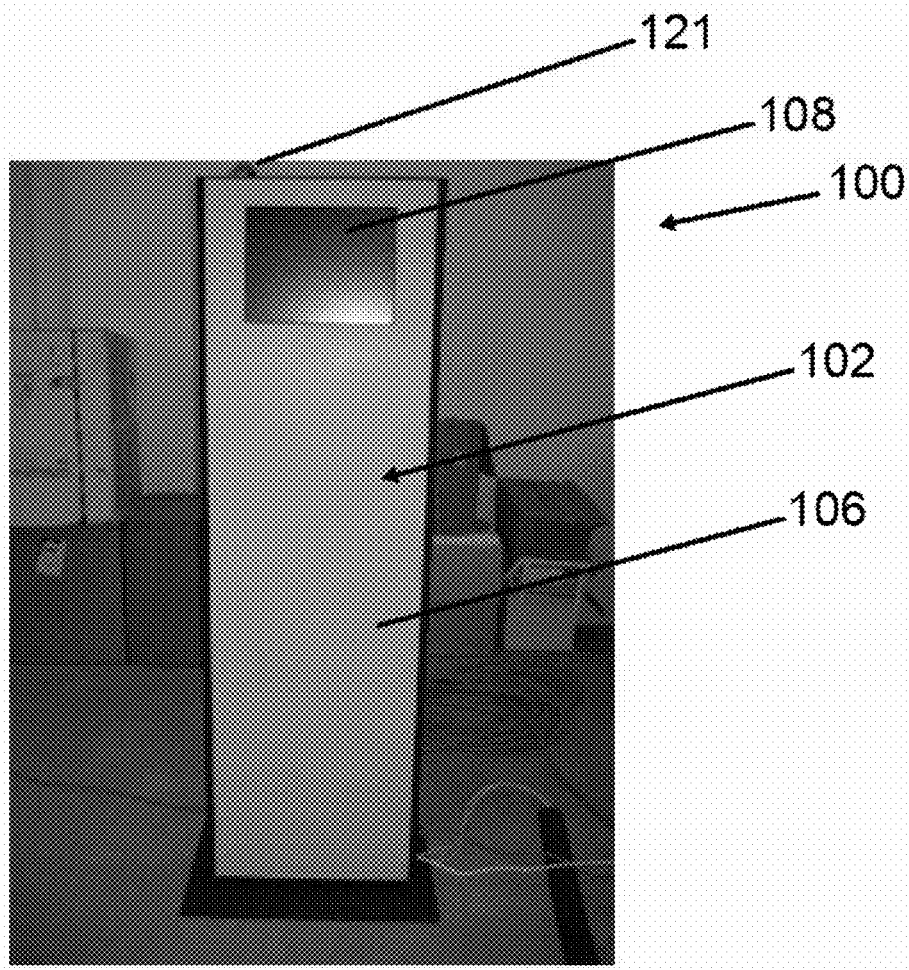
FIG. 7 illustrates one part of a Portal according to a disclosed embodiment.
Figure 8:
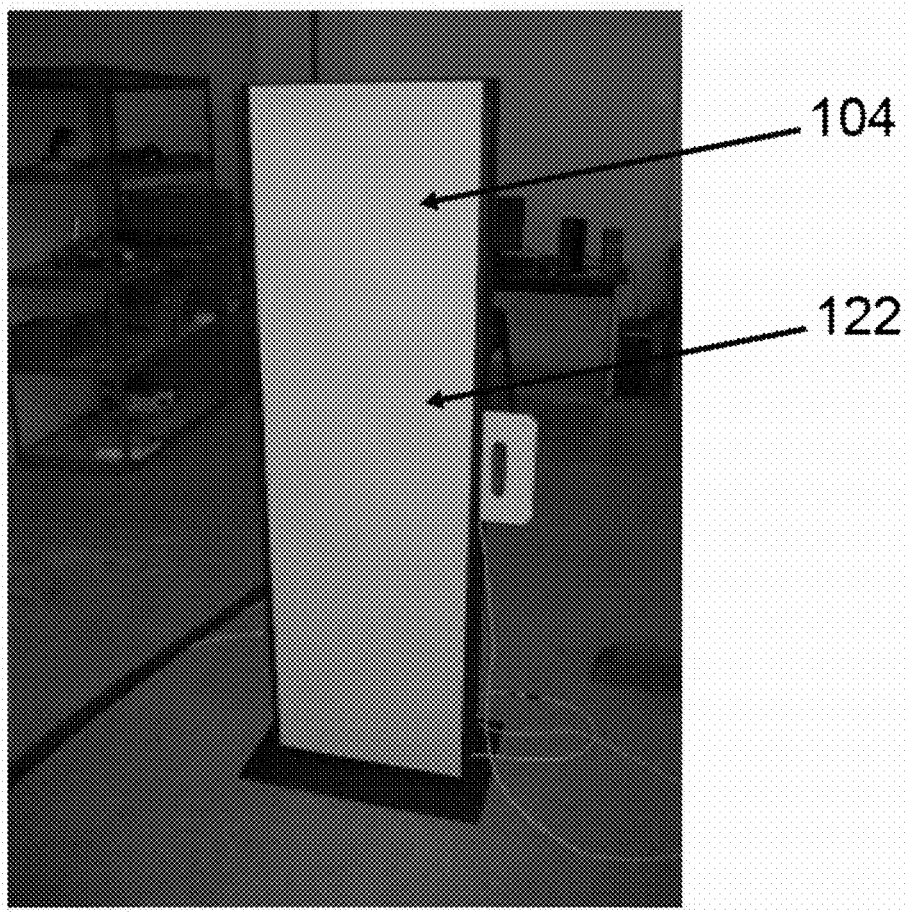
FIG. 8 illustrates another part of the Portal according to a disclosed embodiment.

FIGS. 7 and 8 illustrate a Portal 100, which consists of opposing first and 102 and second 104 Portal members. The Portals are about six feet in height and about two feet in width. The Portals 100 are intended to be positioned at the egress location for a library of tapes. The configuration is similar to that for security gateways at libraries or airports. An employee must pass through the Portal, between the Portal members, with all he or she carries or carts, in order to enter or exit the library. A Portal can be one sided, that is, configured to only be a first Portal 102 and not contain a second Portal 104.

As will be explained in greater detail, below, the Portal 100 is capable of scanning, or interrogating, an area, or zone, between the Portal members 102, 104. By design, the interrogation zone is one size during inventorying (configured as, e.g., a "Step 2" scan, a "Step 3" scan, a "Step 4" scan, etc., discussed below), i.e., inventorying tapes with RFID tags that are being brought through the Portal. On the other hand, the interrogation zone is another size during idle scan (configured as a "Step 1" scan, discussed below), i.e., when no tapes are actively brought through the Portal 100.

For example, the power to the Portal 100 is lower during idle scan, so that the interrogation zone during this scan period is relatively smaller. This saves power and prevents the scanning of tapes not being removed from the library. Only during inventorying, e.g., a "Step 2" (or higher step level) scan, must the Portal power be raised to the level where the Portal can see each tape cartridge in its proximity. Casting a broader electric net enables a more quick and efficient scanning of tapes being removed from a library. The power can be increased even further, e.g., during a "Step 3" scan, if the reader is looking for "missing tags" following a "Step 2" scan. These scenarios will be addressed later.

Figure 9:
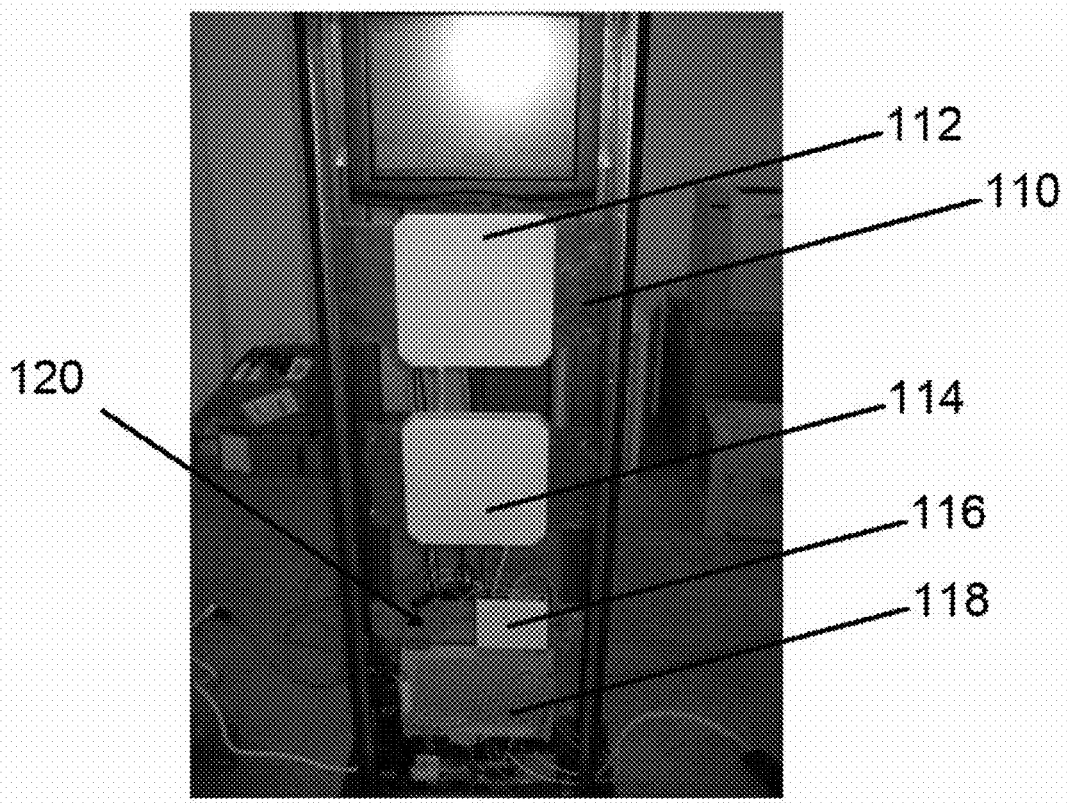
FIG. 9 illustrates components of the Portal of FIG. 7.

Turning further to the specific components of the Portal 100, the first Portal member 102 includes a plastic cover 106 and a touch screen monitor 108. As illustrated in FIG. 9, under the cover 106, the first Portal 104 includes a support rack 110, a pair of height-wise spaced (top and bottom) RFID antennas 112, 114, a wireless bridge 116, an RFID reader 118, a virtual PC 120 and an illuminating member 121 (FIG. 7).

The illuminating member, the operation of which is disclosed below, can be an LED array capable of producing differing colored lighting as disclosed in the present application. The illuminating member can be accompanied with an audio component such as an alarm. A camera can also be present to record activity at the Portal.

Figure 10:
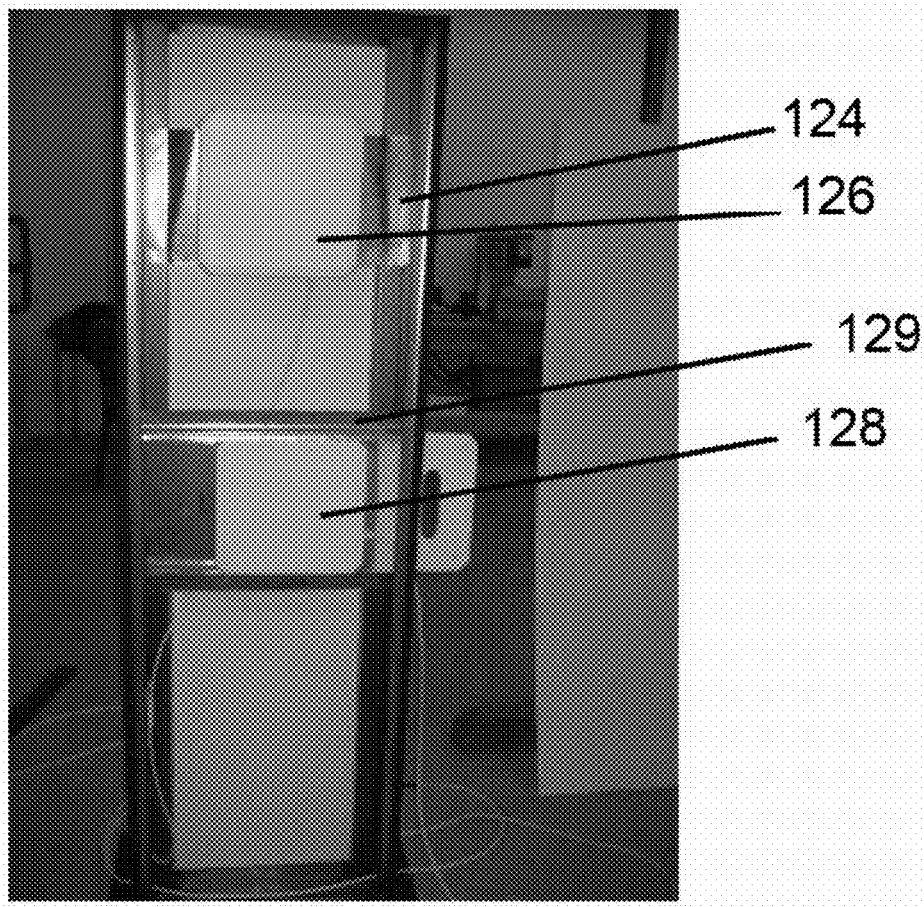
FIG. 10 illustrates components of the Portal of FIG. 8.

As illustrated in FIG. 8, the second Portal member 104 also includes a plastic cover 122. Under the cover 122, as illustrated in FIG. 10, the second Portal includes a support rack 124 as well as third and fourth height-wise spaced (top and bottom) RFID antennas 126, 128.

The third antenna 126 is angled downwardly, such as by ten degrees, to provide an improved RF signal within the interrogation zone. The fourth antenna 128 is connected to a handle 130 and is removable in order to optionally be used as a handheld "wand."

The fourth antenna 128 is slidably positioned on a track 129 within the support rack 124. Furthermore the fourth antenna 129 may be removed from the side of the second Portal 104, through an appropriately shaped slot in a side panel in the support rack 124. An example of an appropriately shaped slot is a rectangular slot.

Figure 11:
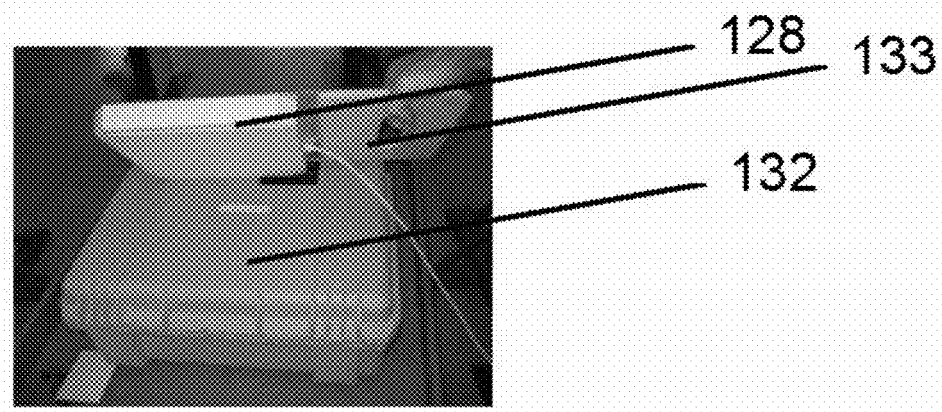
FIG. 11 illustrates usage of a hand held antenna illustrated in FIG. 10.

As illustrated in FIG. 11, the fourth antenna 128 is used to scan the contents of, e.g., a case 132. The backing material 133 for the wand antenna 126 is a PCB material, preventing the scanning of tags behind the antenna 126. Furthermore, each of the antennas is positioned at a unique height compared with each other antenna so that each antenna covers at least a portion of a unique area within the interrogation zone.

The RF antennas are, for example, Cushcraft S9028PC12NF (902-928 MHz operational frequency band, 7.5 dBic-dBi gain, 65-3 dB beamwidth elevation and azimuth plane, circular polarization, wall/surface mount) for powering the tags 20. Circular polarization antennas are preferable to linear polarization antennas because tags may be oriented at any angle in mobile carts or cases when being removed from the library.

The RF reader 118, such as Impinj Speedway model IPJ-R1000-USA (Impinj Speedway RFID Reader; 4 Port UHF (915 MHZ) EPC Class 1, "Gen2" Capable—Supports 4 Agile Series II Omniwave Antennas; Includes 110 VAC Power Supply; Web Server Integrated Into Reader For Reader Management) is provided which reads information from (and is capable of writing on) the powered tags 20.

The virtual PC 120 runs Windows XP emulation software from a remote Windows XP server, to which the PC 120 is connected via the wireless bridge 116, which is, e.g., a typical networking component available from, e.g., D-Link Corporation, 17595 Mt. Herrmann Street, Fountain Valley, Calif. 92708. Programs accessed by the PC 120 are configured for processing information having the discussed tag schema layout.

The software operated on the virtual PC 120 controls the RF reader 118 and the RF antennas 112, 114, 126, 128 to power the tags 20. For example, the software instructs the RF reader 118 to communicate with each respective tag 20, so as to determine the number and identity of all tapes in the interrogation zone, identified by the previously written information in each respective tag 20. As indicated, information on the tags 20 matches the human readable information 12 and barcode information 14 printed on each label 10.

Figure 12:
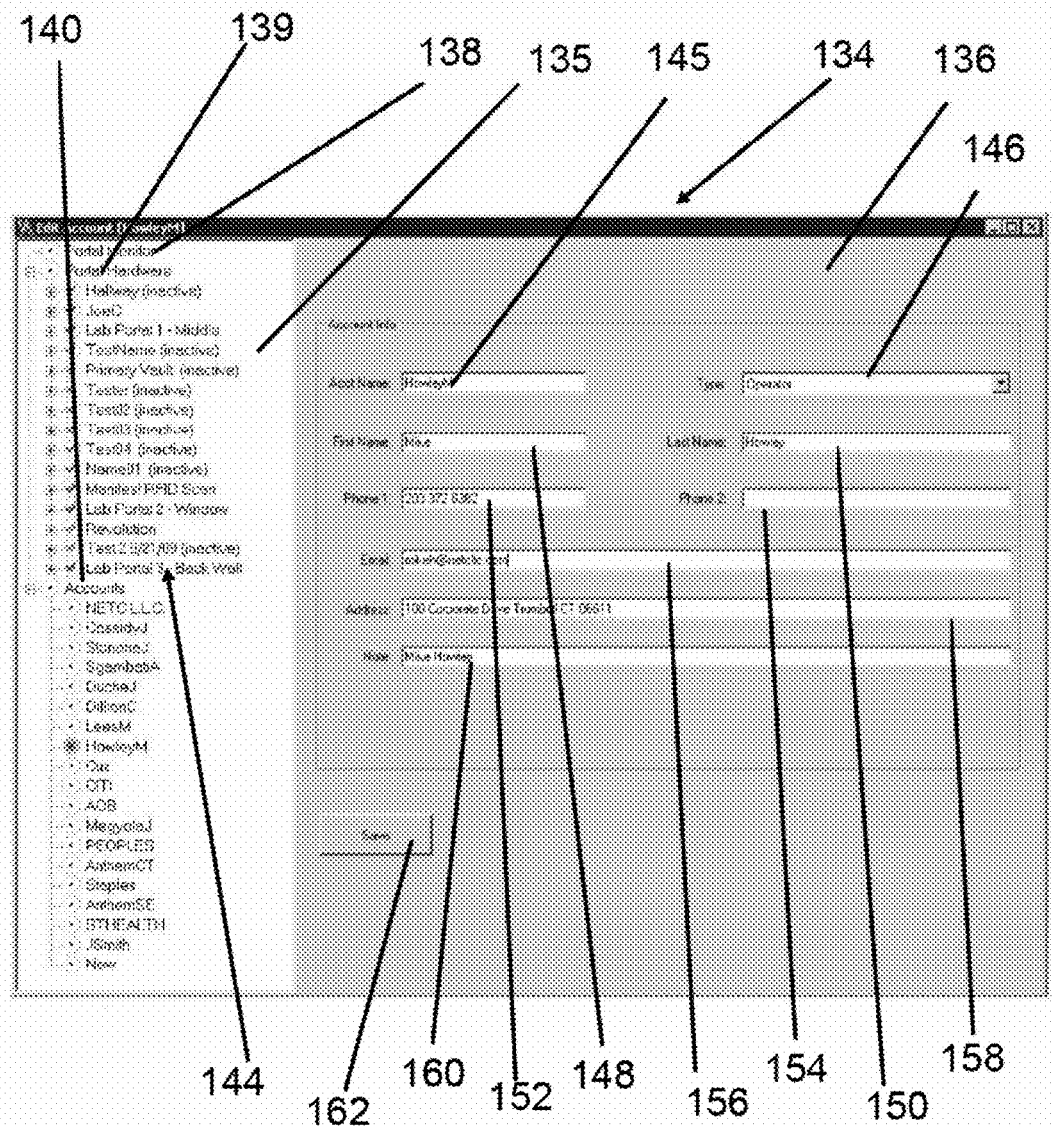
FIG. 12 illustrates one user interface for the programming the Portal.

Turning to FIG. 12, a user interface for software 134 for the Portal 100 is illustrated. This interface will be displayed on a server-side screen rather than a Portal-side screen. Various higher-level definitions and Portal configuration parameters are set via this interface, as will now be examined.

The software has left and right screen quadrants 135, 136. The left quadrant 135 provides a tree menu listing various higher-level system and Portal specific configuration parameters which can be engaged at a server-side computer. Three system primary configuration parameter branches listed in FIG. 12 include "Portal Monitor" 138 (FIG. 16), "Portal Hardware" 139 (FIGS. 13-14) and "Accounts" 140 (FIG. 12). As will be seen, the last two branches are defined by additional sets of configuration parameters.

As indicated, the Accounts branch is accessed by the server-side user in FIG. 12. Using the Accounts branch 140, a server-side user can enter system users into the system. As discussed below (FIG. 13), system users can thereafter be assigned as operators to one or more identified Portals.

System users are defined by sets of configuration parameters and illustrated as branches 144 under the Accounts branch 140. There are nineteen identified system users in the illustrated embodiment. The system users, in this example, include "NETC L.L.C.", "CassidyJ", "StonohaJ", "SgambatiA", "DucheJ", "DillionC", "LeesM", "HowelyM", "Cuz", "Citi", "AOB", "MegyolaJ", "PEOPLES", "AnthemCT", "Staples", "AnthemSE", "STHEALTH", "JSmith", and "New". As can be seen, a system user can be a person or an organization, which, e.g., would appoint an authorized agent. The set of configuration parameters for the system under the user named "HowelyM" is being examined in FIG. 12.

The server-side user interface for entering or modifying the set of configuration parameters defining a system user is on the right side of FIG. 12. This interface becomes available upon engaging one of the user-name branches under the Accounts branch.

The set of configuration parameters under the Accounts branch is populated by nine fields, including eight input fields and a pull down menu. The nine fields include Account Name 145, which is "HowelyM", and Type 146, which is the pull down field, and which currently lists "operator," as compared with, e.g., "Administrator", "Client", etc. First and last name input fields 148, 150 are provided, which in the example are "Mike" and "Howley". Accordingly, Mike Howley is being designated as a Portal Operator.

Primary and alternate phone number input fields 152, 154 are listed. In the example, the phone numbers are populated only by a primary phone number, which is "209 372 6382". Email and postal mail input fields 156, 158 are provided, which are populated by "mikeh@netcllc.com" and "100 Corporate Drive Trumbull Conn. 06611". A Notes input field 160 is provided, which can be used for any purpose and which, for illustration only, lists "Mike Howely". A save button 162 enables the saving of the input information to the remote server.

Figure 13:
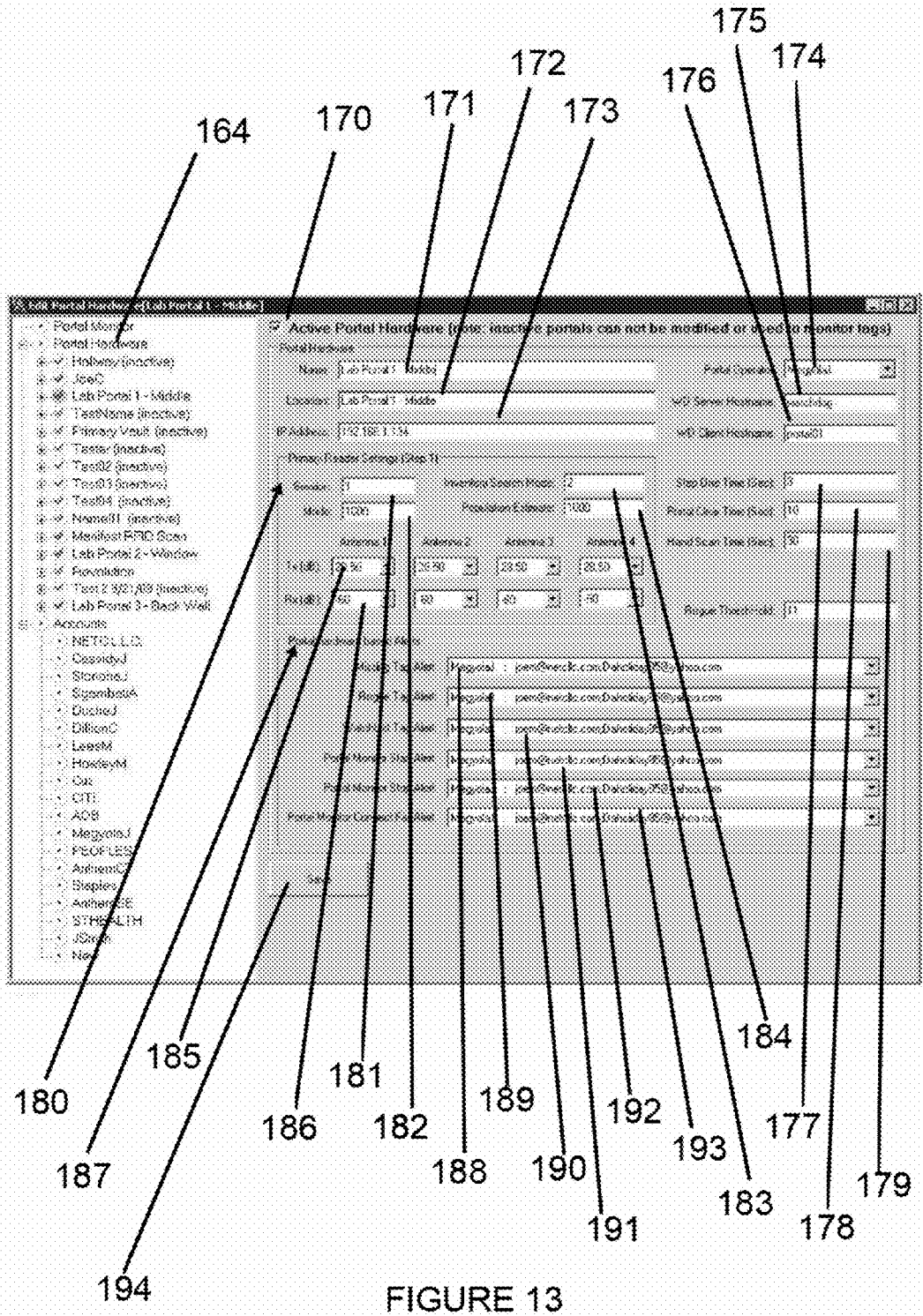
FIG. 13 illustrates another user interface for programming the Portal.

Turning next to FIG. 13, the Portal Hardware 164 branch is examined, which represents higher level Portal definitions and configuration settings for each Portal, including each individual RFID antenna and reader in each Portal (e.g., at each library). Primary sets of configuration parameters, listed as Portal Hardware names on the tree menu, represent the default settings which apply throughout the active (as compared with inactive) operation of each respectively listed Portal.

These sets of configuration parameters also define the properties of the Portal RFID readers during an "Step 1" (idle) scan Portal configuration, i.e., before an RFID enabled item enters the Portal interrogation zone and when such an item initially enters the zone. Adjacent to each Portal name is an identifier of whether the specific Portal (and therefore its configuration parameters) is active or inactive.

For each of the following Portals, in this example, there is a set of configuration parameters: "Hallway (inactive)", "JoeC", "Lab Portal 1-Middle (inactive)", "TestName (inactive)", "Primary Vault (inactive)", "Tester (inactive)", "Test02 (inactive)", "Test03 (inactive)", "Test04 (inactive)", "Name01 (inactive)", "Manifest RFID Scan", "Lab Portal 2-Window", "Revolution", "Test 2 9/32/09 (inactive)", and "Lab Portal 3—Back Wall". Each set of configuration parameters without an "inactive" identifier represents an active Portal (and therefore an active primary set of configuration parameters).

The name of the set of configuration parameters for each Portal, as with all definable names herein, is user definable and are not limited by, and need not be directly associated with, the hardware, location, or specific manifests or cassettes in the library. It is only important that the entity which employs the system understand the naming convention.

The set of configuration parameters being examined in FIG. 13 is for the "Lab Portal 1—Middle." The Portal Hardware (and therefore the related set of configuration parameters) is activated through a toggle switch 170. The user interface for the set of configuration parameters for the Portal is populated by twenty-eight (28) fields defining the higher level operations of the Portal. A block of these fields (under 180, discussed below), are listed as a "Step 1" configuration which, by default, controls the system during an idle scan.

While only a "Step 1" (idle) scan configuration need be defined to run a Portal, secondary sets of scanning parameters for each Portal can be defined for configuring the Portal during inventorying. These sets of parameters are illustrated as secondary branches under each respective set of primary configuration parameters 164 for the respective Portal. These secondary sets of configuration parameters define the above mentioned "Step 2" and higher level inventorying scans (e.g., a "Step 3" scan, a "Step 4" scan, etc.; see FIG. 14), which are executed in order in which they are programmed and appear. These secondary sets of configuration parameters also include a "New Tag" inventorying configuration (FIG. 13A), for introducing new tags to the system. Each of these types of defined configurations is discussed in greater detail, below.

These secondary sets of configuration parameters define additional modes of operation for the Portal. The "Step 1" (idle) scan configuration does not control at a time when one of these other configuration parameters is activated by the Portal. However, as indicated, the other parameters listed under the primary set of configuration parameters, which are not limited to a "Step 1" scan configuration of the Portal, remain active as long as the Portal remains active.

As illustrated in FIG. 13, both Name and location input fields 171, 172 are populated in the example by "Lab Portal 1-Middle," and an IP Address field 173 is populated by "192.168.1.134". An operator for the specific Portal is selected through a pull-down menu 174, through which a system user can be selected. In the example, the system user selected as the Portal operator is "MegyolaJ."

Server Hostname and Client Hostnames input fields 175, 176 are provided. These fields identify the name of the host computer and the name of the client computer, which here are "watchdog" and "portal01", respectively. The use of each of these fields would be apparent to a skilled IT professional upon reading the disclosure of the invention.

Three time based input fields are provided, including a "Step 1 Time", a "Portal Clear Time", and a "Hand Scan Time", 177, 178, 179, each of which is populated in seconds. The "Step 1 Time" is listed as "3" seconds. As indicated, "Step 1" is the idle step and therefore the "Step 1" settings are applied. Once a tag is detected in the portal, (3) seconds will elapse before "Step 2" is invoked. Even during a three second idle scan, however, with the equipment involved, the Portal can detect well over one hundred items.

The "Portal Clear Time," which is not limited to the "Step 1" (idle) scan configuration, is listed as "10" seconds. The "clear Portal" timer is started after a "pass" or a "fail" event (see FIGS. 17, 19, 20 and 21, discussed below). The timer allows the operator to clear the Portal to move on ("pass"), or start again ("fail") after correcting a problem. In other words, it allows the user to leave the Portal area without being seen and processed again. Further, the "Hand Scan Time," which is not limited to the "Step 1" configuration, represents the duration that a hand scanner is active (see figure the use of the hand scanner is discussed, below).

Figure 21:
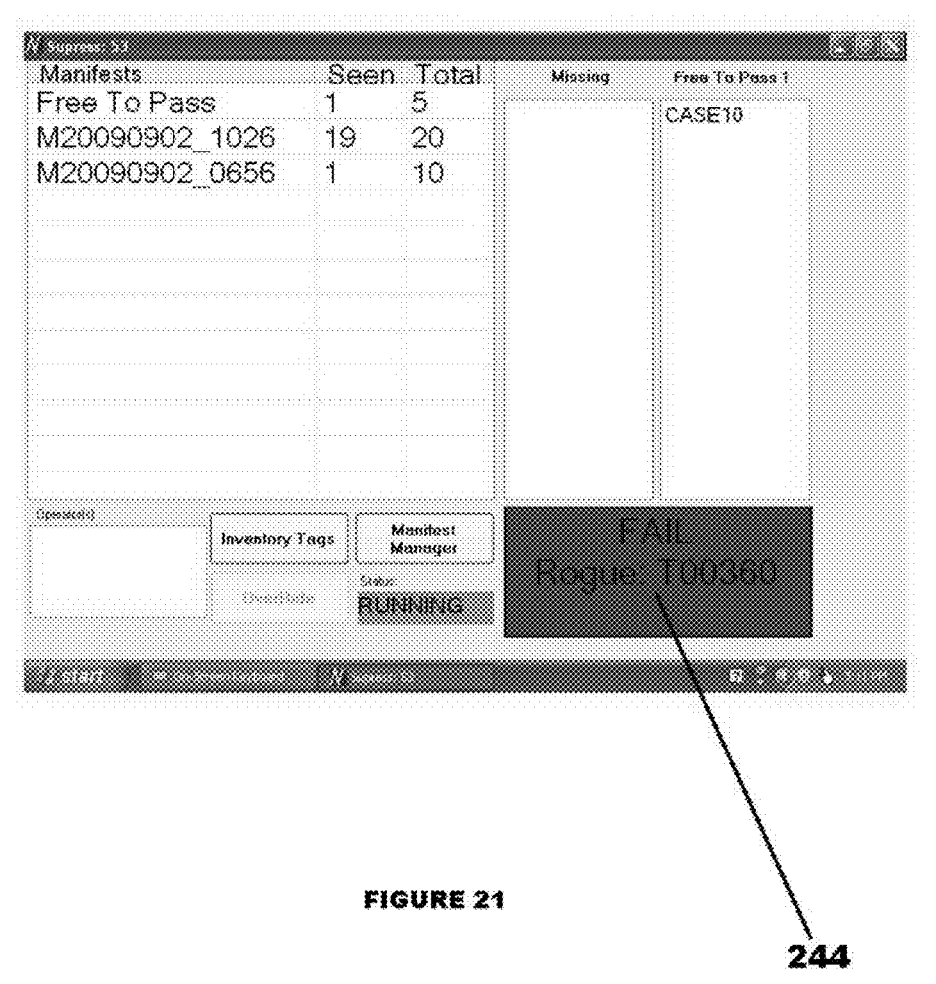

A Rogue Threshold is provided, under the Hand Scan Time, which includes the value "11." A Rogue tag, as illustrated in FIG. 21, is a tag which has been identified during most steps (excluding new tag inventorying), as will be explained below, so long as the system identifies the tag as not belonging to any identified Manifest or identified as a "Free to Pass" item (see FIG. 17, discussed below).

The value "11" is a sensitivity rating used to determine if a tag is within a Portal interrogation zone or just moving around the outside of the Portal interrogation zone. In other words, it represents the variance of a given population of reads of the reported signal strengths of an RFID tag entering or positioned in close proximity of the stationary RFID interrogation zone. The higher the value, the closer the tag needs to be to the Portal for the system to conclude that the tag is being passed through the Portal and not remaining on one side of the Portal (e.g., remaining within the library).

Settings specifically limited to the "Step 1" (idle) scan configuration are listed in the Primary Reader Settings 180. When an RFID tag enters the interrogation zone, it is initially not active, i.e., it is asleep. During the idle scan, the antenna powers the tag and the readers determine if the tag contains a dataset as illustrated in FIGS. 4-6, e.g., whether it is for an item which belongs in, and is being taken from, the library.

Session 181 represents one of the four industry standard Gen2 session definitions, which in the illustration is "1," representing an S1 session. This is the default session setting for the Portal because it provides preferred results for dynamic applications with single target inventory.

Mode 182 represents standard or proprietary reader configurations for a single, multiple or dense interrogator operation. The mode of "1000" represents the auto-dense interrogator mode, specific to the Impinj reader hardware utilized in this embodiment. Standard RFID modes referenced herein include "1" (generic hybrid mode) and "4" (a generic dense reader mode).

Regarding the inventory search mode, the values of "1" and "2" are used in this embodiment. The search mode value of "1" represents 'Single Target Inventory,' applicable with a high tag count, for high-throughput applications where a reduction in repeated tag observation is acceptable. The value of "2" represents 'Dual Target Inventory,' applicable with in low to medium tag count or low-throughput applications where, repeated tag observation is desirable. These definitions are also industry standard.

The population estimate references the number of tags which are expected to be inventoried via the Portal. The more tags the Portal expects to see, the longer reader processing period will be. Accordingly, the smallest reasonable value is preferred. Here, the default value is 1000.

Additionally, each of the four antennas is configured for a "Step 1" (idle) scan configuration via respective Tx and Rx fields, correlating to the transmission and reception of radio frequency signals, listed in dB. For "Antenna 1", the Tx and Rx fields 185, 186 are populated with "28.50" and "−60". The same Tx and Rx settings have been input for "Antenna 2" through "Antenna 4."

The fact that the Tx and Rx settings are the same for each of the antennas means that each antenna transmits and receives signals at the same strength. They would be different to change the characteristics of the Portal to make one or more Portal scanning areas stronger or weaker than others.

For example, while in a "Step 1" (idle) scan configuration, an Rx value of −60 and a Tx value of 28.50 are used for this Portal. Other values may suit other Portals based on, for example, the size of the interrogation zone. On the other hand, while inventorying, such as during a "Step 2" scan, an Rx value of −70 and a Tx value of 30 are used (see FIG. 14, discussed below). Such settings provide a stronger scan in the scanning area so that, e.g., less sensitive RFID labels can be activated and reported by the reader.

Having a weaker scan during the idle time period is warranted because there is only a need to see when an RFID is close to the Portal. This prevents a constant scanning of all tags in a library which are proximate to the Portal.

Other configuration parameters not limited to a "Step 1" (idle) scan configuration are listed in area 187, which identify six generated Portal Based Alerts and email recipients of the alerts. Those alerts are triggered when, e.g., a tag is identified as missing 188 (FIG. 19), a rogue tag is identified 189 (FIG. 21), a "Watchlist" tag is identified 190, a Portal Monitor Start occurs 191 (FIG. 16), a Portal Monitor Stop occurs 192 (FIG. 16) or a Portal Monitor Connect Fail occurs 193.

The default email recipient of the alerts is the designated Portal operator, though the email alerts may be forwarded to other system users for which an email address has been input (item 156, FIG. 12, discussed above). It can be appreciated that more than one system user may be capable of taking RFID tagged items through the Portal, but only one person can receive any one type of alert at any one time.

Specific ones of these trigger events are discussed in greater detail, below. However, an event such as a "connect fail" can be detected in an ordinary way in which a local area networked component is detected as being disconnected. Further, a save button 194 enables the saving of the configuration parameters to the remote server.

Regarding a "Watchlist" alert, a "Watchlist" tag is an RFID tag (tape cartridge) that has been put on the WatchList. The WatchList is used to find and alert when a tape is seen. The tape may be lost and when it is seen by the system, an alert is issued both to the operator and anyone on the alert list.

Figure 13A:
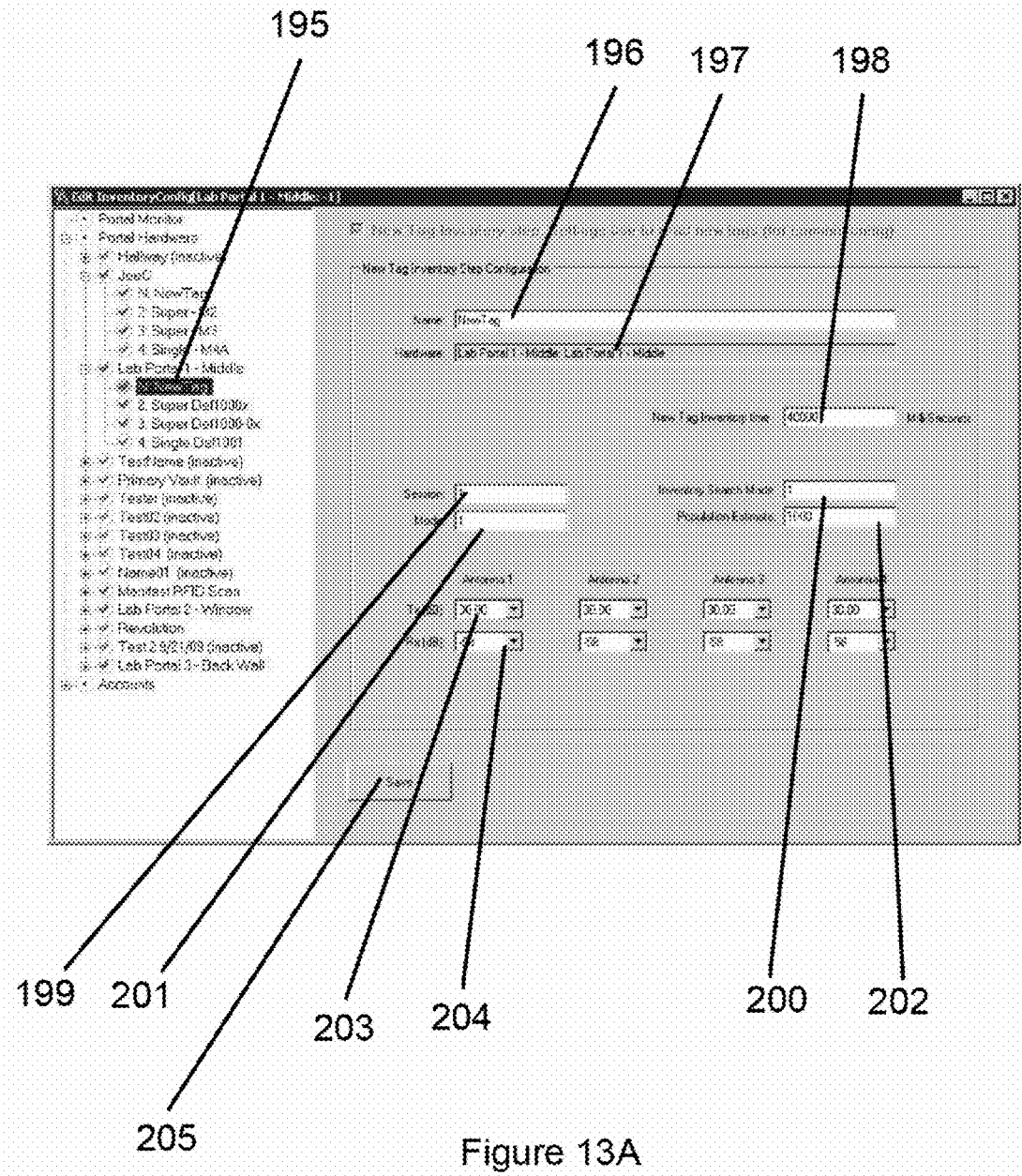
FIG. 13A illustrates another user interface for programming the Portal.

Once the primary set configuration parameters are set for a Portal, other configuration parameters may be set on the server-side, including configuration parameters for defining New Tag Inventorying, illustrated in FIG. 13A. The new tag inventorying step (FIG. 23) enables a user to inventory one or more new tags at any period of time.

To configure a Portal for new tag inventorying, a server-side user engages the "N: New Tag" branch 195, which corresponds to a set of secondary configuration parameters, illustrated as a branch under each listed Portal. Thus, the new tag inventorying configuration relates to, and can only be activated with, a specified Portal under which it is listed. In the illustration, the Portal for which the set of New Tag Inventorying configuration parameters are being examined is "Lab Portal 1-Middle".

The set of New Tag Inventorying configuration parameters includes, as illustrated on the right hand side of FIG. 13A, a "Name" field 196 for naming the set of configuration parameters for the specific Portal. Below this field is a Portal Hardware identifier field 197, which is not configurable on this screen as it relates to the Portal under which it is a secondary branch. Accordingly, this field lists "Lab Portal 1-Middle" in the illustration. The time period at which the inventory period lasts is programmable in the field titled "New Tag Inventory Time" 198, which is listed as 40 seconds (or 40000 milliseconds).

Other fields include a session field 199, which is "1", a mode field 200, which is "1", an inventory search mode field

201, which is "1", and a population estimate field 202, which is "1000". The explanations for these values are provided, above.

In addition, the transmission and reception parameters of the four antennas are controllable via respective field banks 203, 204. In this illustration, during new tag inventorying, the transmission fields are powered to 30 dB, and the reception field is powered to −58 dB for all antennas. A save button is provided as well 205.

As indicated, one or more sets of inventorying configuration parameters for cassettes already within the system, e.g., a "Step 2" (or higher) scan, can be created (see FIG. 14, discussed next). Configuring these "steps" enables the software to intelligently interrogate tags within that Portal's interrogation zone and to ignore tags outside of the interrogation zone.

Figure 14:
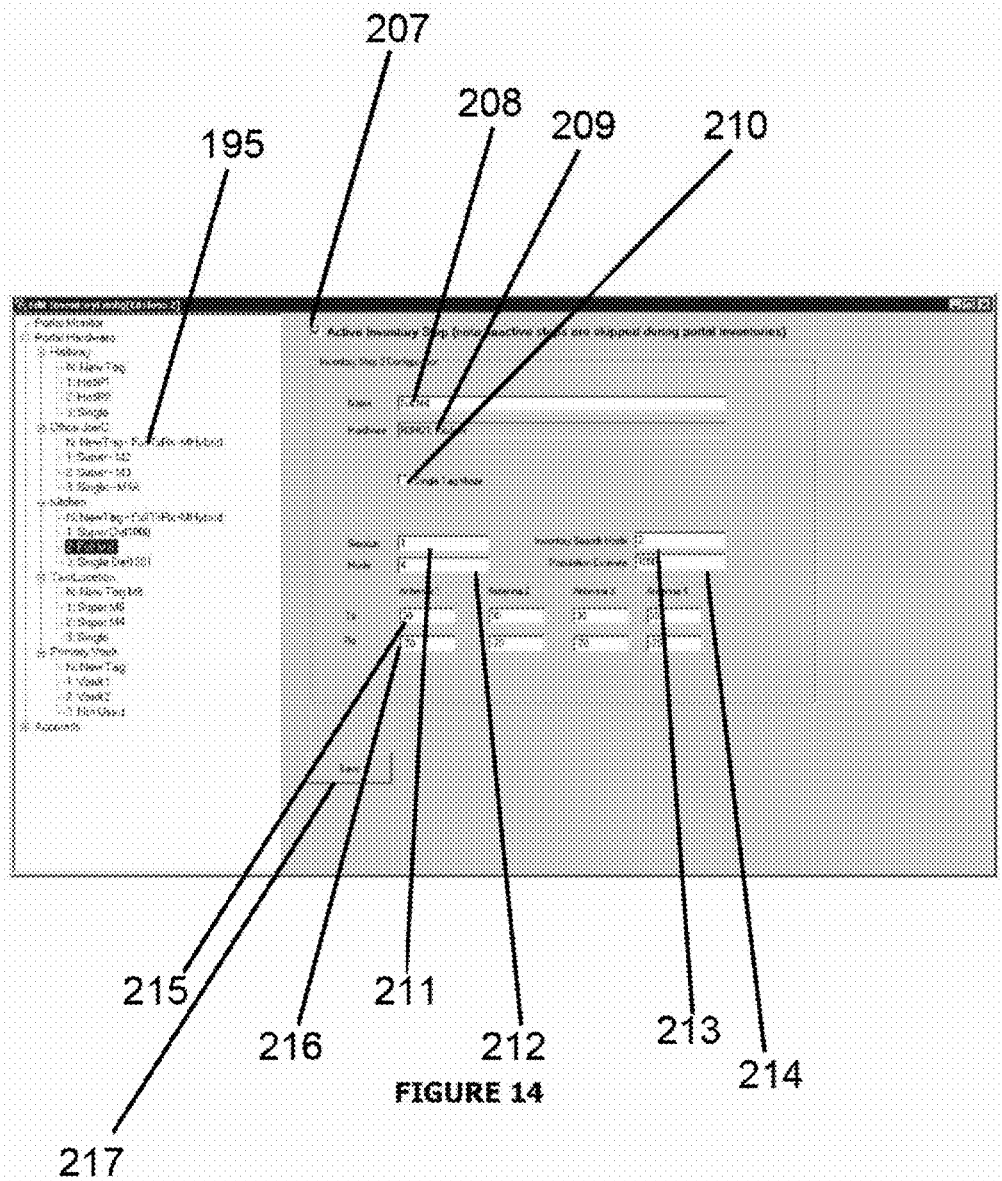
FIG. 14 illustrates another user interface for programming the Portal.

Turning to FIG. 14, three sets of configuration parameters defining additional inventorying configurations are listed as secondary branches, under the "N: NewTag" Inventorying configuration parameter, for each Portal. These could define, e.g. a "Step 2" scan, a "Step 3" scan, and a "Step 4" scan. However, there is typically no reason to define a "Step 4" scan, so that one of these could define a set of test parameters while the other two define the configuration parameters for the "Step 2" and "Step 3" inventorying scan. As with each set of New Tag Inventorying configuration parameters, these sets of inventorying configuration parameters can only be activated with the particular Portal under which they are listed.

As illustrated in the figure, if one of the sets of inventorying configuration parameters is not utilized, "Not Used" can be listed as its name in the tree menu. In FIG. 14, the following three sets of configuration parameters have been created under the "Kitchen" Portal, as illustrated by their respective branches under the Portal name: "1: SuperDef1000"; "2: Full Mill"; "3: Single Def1001". These different inventorying modes would be respectfully define a testing scan configuration, a "Step 2" scan configuration and a "Step 3" scan configuration, as discussed below.

To view or modify a set of inventorying configuration parameters for, e.g., a "Step 2" scan, the server-side user engages the appropriately named branch on the tree menu. The same process applies when approaching any inventorying configuration. In FIG. 14, the "Full Mill" configuration parameters under the "Kitchen" Portal location are being examined. The associated inventorying configuration parameters for the "Step 2" scan include various fields, which are graphically illustrated as disclosed on the right side of the figure.

A toggle switch 207 enables a server-side user to turn on or off the use of the specified set of inventorying configuration parameters for the "Step 2" (or higher) scan as may be desired. For example, This can occur in the process of setting up a portal and determining the best step settings, i.e., a testing configuration.

Name and hardware fields are provided 208, 209. The name field is an input field which defines the name of the inventorying configuration, which, as indicated, is "Full Mill." The hardware field is not editable but rather taken from the Portal under which this set of configuration parameters is listed. Another toggle switch 210 enables the Portal to run in a "Single Tag Mode" while in an inventorying configuration.

"Single Tag mode" tells the reader to look only for the missing tags (discussed below), one tag at a time, during inventorying. Normally, a "single tag mode" is the highest step defined for the system, e.g., a "Step 3" scan. During this period, the reader is looking only for missing tags and the power to the reader is turned up to provide a stronger signal. Accordingly, while "Single Tag Mode" is not selected under "Full Mill," it likely is selected for the "Single Def1001" configuration.

It is to be appreciated that with the Full Mill scan configuration defining a "Step 2" scan, it is likely that the Single-Def1000 mode was an experimental scan configuration for the Portal.

Additional input fields in FIG. 14 relate to the reader's inventorying configuration specifically for this "Step 2" scan. Again, the server-side user may define session and mode input fields 211, 212 which are again populated with "1" and "4." Inventory Search Mode and Population Estimate input fields 213, 214 may again be defined, which are again are populated with "2" and "1000".

Furthermore, for each of the four antennas, the Tx and Rx fields may again be defined in dB. For "Antenna 1", the Tx and Rx fields 215, 216 are populated with "30" and "−70". The same Tx and Rx settings have been inputted for "Antenna 2" through "Antenna 4."

The noticeable differences in the reader configuration between the "Step 1" (idle) scan configuration and this "Step 2" (inventorying) scan configuration is the higher Rx setting for each antenna, for reasons discussed above. Finally, a save button 217 enables the saving of this set of configuration parameters to the remote server.

Furthermore, a timer for this or any other inventorying configuration ("Step 2" (or higher) scan) is not listed. This is because the Portal calculates the time for each inventorying step during the scan itself. The system sees all the present manifests based on the cartridges or tapes in its interrogation zone, and based upon the total number of items in all manifests seen, the amount of time for each subsequent step is calculated. For example, if tapes for two manifests are within the interrogation zone, more time is allotted if the two manifests total one hundred tapes than if the manifests total just two tapes (one each).

It is to be appreciated that "steps" are defined to instruct the RFID Portal to enter into a state indicated by the settings for that "step". Steps are independent of the cartridges in the library. Steps are server-side user defined and are not limited in number, although two or three defined steps are sufficient to define the range of operations required for the Portal, depending on the environment.

Figure 15:
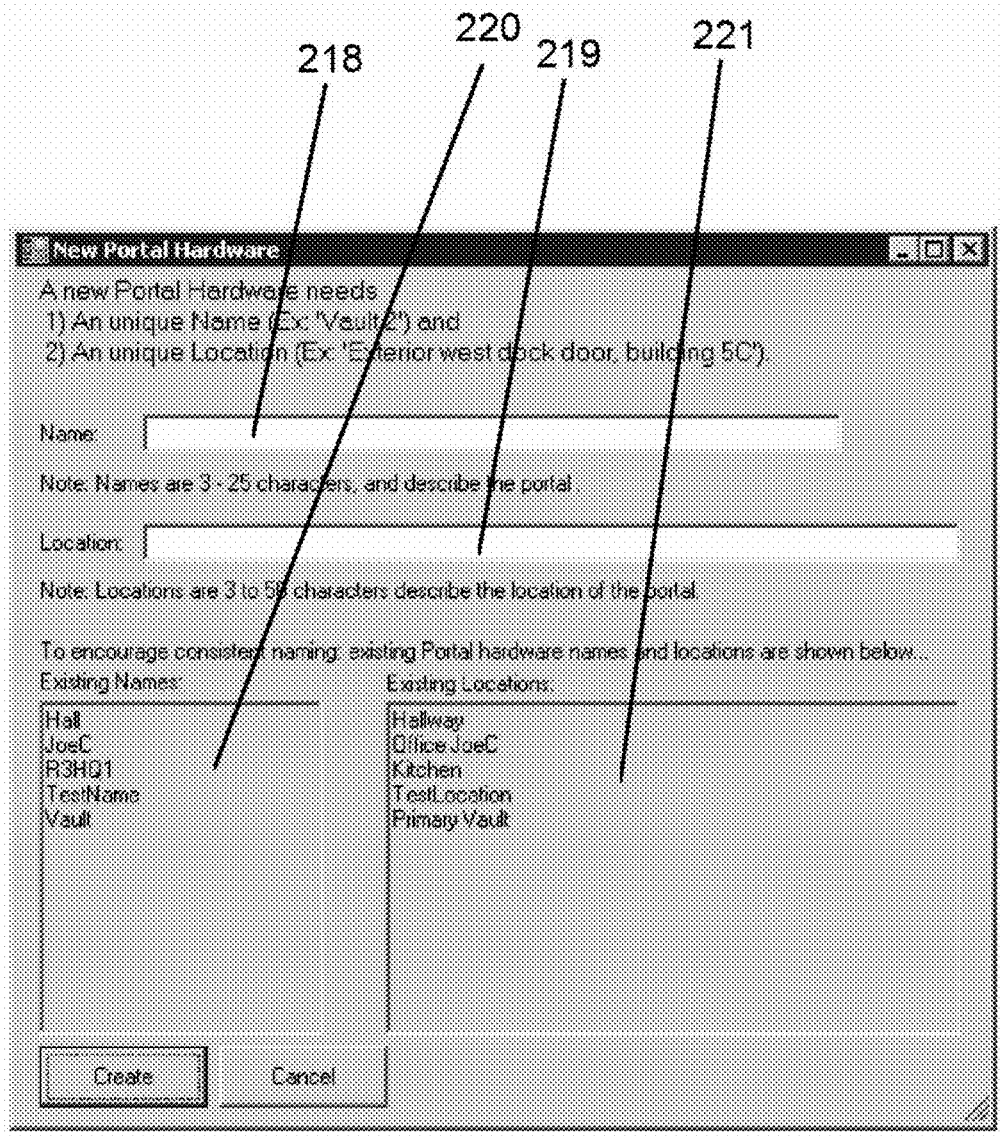
FIG. 15 illustrates another user interface for programming the Portal.

FIG. 15 is a server-side screen illustrating the screen provided when naming a new Portal, and identifying, in words, a location for the Portal. This screen is obtained by, e.g., right clicking on "Portal Hardware" in the tree view. This screen includes two fields, 218, 219, for defining the name and location. This screen can be edited for a known Portal if, for example, the Portal is renamed and/or moved between locations. Current existing names, as listed in the lower left quadrant 220 of the screen, include "Hall", "JoeC", "R3HQ1", "TestName", and "Vault". Current existing locations, as listed in the lower right quadrant 221 of the screen, include "Hallway", "Office JoeC", "Kitchen", "TestLocation", and "Primary Vault".

Figure 16:
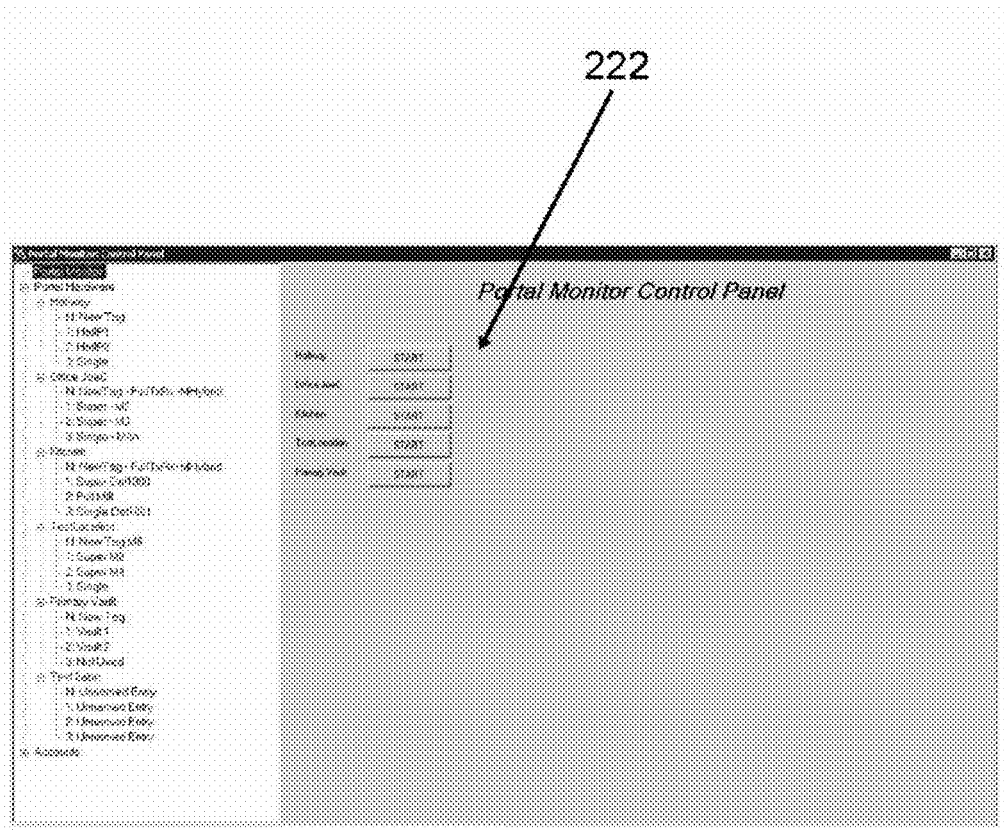
FIG. 16 illustrates another user interface for programming the Portal.

FIG. 16 is the main server-side software control panel screen, which is obtained by engaging the "Portal Monitor" branch in the tree menu on the left side the screen. This screen allows server-side users to start and stop each of the named Portals, which are also listed individually by location on the right quadrant 222 of the screen, i.e., "Hallway", "Office JoeC", "Kitchen", "TestLocation", and "Primary Vault". Adjacent to each named location is an individual "Start/Stop" button.

When Portals are started, they are actively looking for RFID enabled items, e.g., in an idle scan (Step 1). When a Portal is stopped, the client software on the touch screen monitor ceases to run and all Portal activity stops. As illustrated in FIG. 13, an alert would be emailed to the Portal Operator based on starting or stopping the Portal, so that the Portal operator would be aware of the changed Portal status.

Turning to FIGS. 17-23, Portal-side screenshots of the software are provided while inventorying (during a "Step 2" (or higher) scan) and reporting phase. These screenshots are displayed on the Portal touch screen monitor. The related actual screens, when displayed, provide the user feedback and allow user interaction in real-time as RFID enabled items are interrogated and recorded for tracking and reporting purposes.

Figure 17:
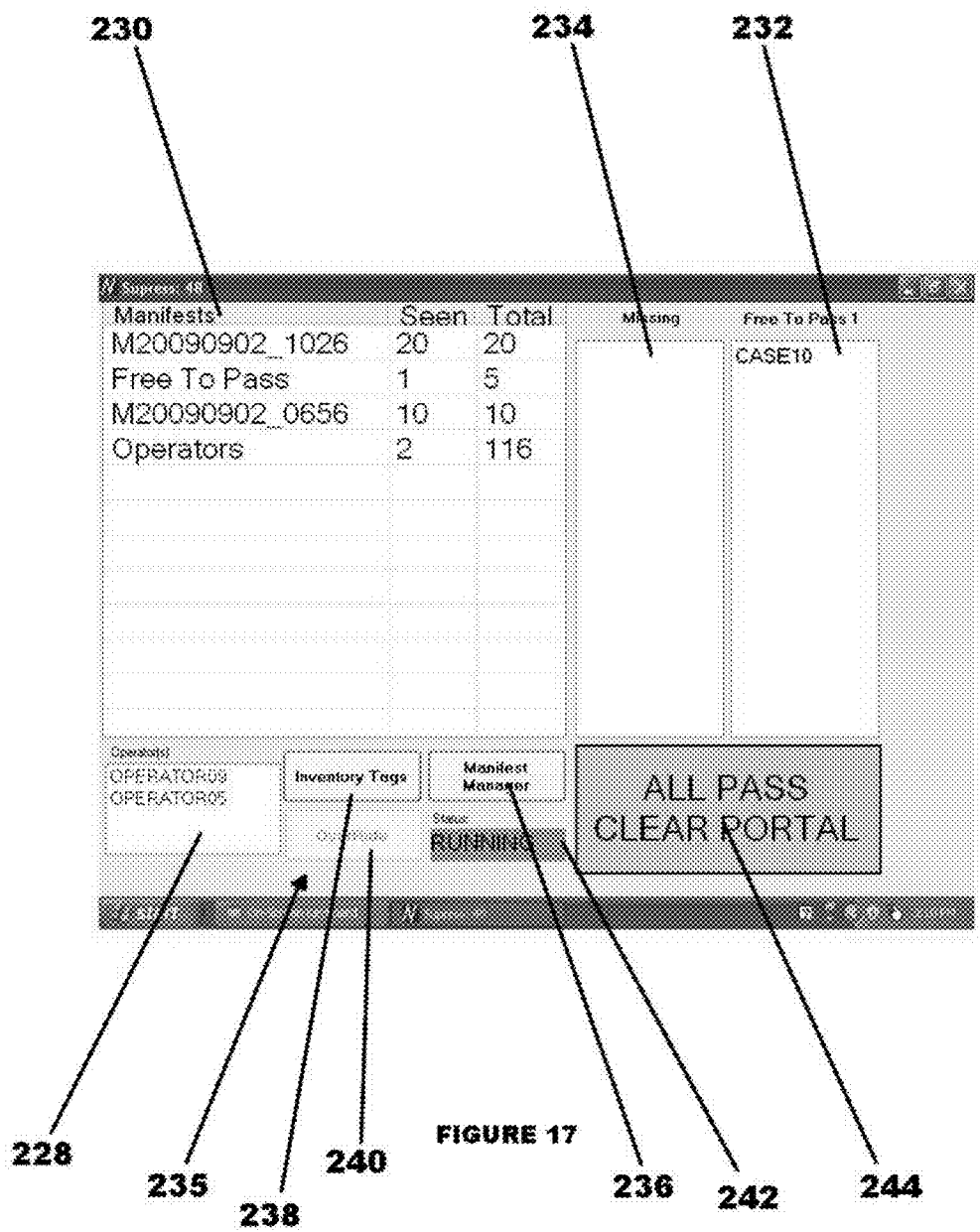
FIG. 17 illustrates one user interface for operating the Portal.

FIG. 17 illustrates an interface which includes a Portal Operator ID frame 228, titled "Operators." In the illustrated example, two different Portal Operators, "Operator05" and "Operator08" have been recognized by the Portal. While neither of these operators was listed in the above Accounts screenshot, accounts for the operators would have been added prior to having access to the tape library. One of these Operators may be the designated Operator for receiving the alter emails, or perhaps another Operator at the library (or elsewhere) is the designated recipient.

The Portal would have recognized the operators by, e.g., electronically readable name tags. Furthermore, it can be appreciated that more than one operator maybe required to obtain all tapes involved in a single manifest, or tapes from plural manifests may be brought through at one time, depending on the circumstance.

A Manifest Itemization frame 230 has is provided in a spreadsheet format with a header row 232. The first column in the header row is titled "Manifest," the second column 236 is titled "Seen," and the third column is titled "Total." More specifically, the following is provided in the Manifest Itemization frame of FIG. 17:

| Manifest | Seen | Total |
|---|---|---|
| M20090902_1026 | 20 | 20 |
| Free to Pass | 1 | 5 |
| M20090902_0656 | 10 | 10 |
| Operators | 2 | 116 |

The bottom row of the Manifest Itemization frame identified that two operators have been "seen" by the Portal during this inventorying session. This is consistent with the indication in the Operator ID Frame, field 228. The "Total" column lists "116," indicating that, at that location, such as "Primary Vault", a total of 116 operators are listed, graphically as individual branches, under "Accounts."

The second and fourth data rows identify two different pre-defined manifests from which at least one tape was recognized as part of the groups of cartridges (e.g., batches) that are within the active interrogation zone. Specifically, the two manifests recognized by the system are M20090902_1026 and M20090902_0656. These two manifests were named in part using a numerical convention "M" representing "manifest," in part using date convention, i.e., Sep. 2, 2009, and in part using an additional numerical convention, e.g., 1026 and 0656, which serve to distinguish the two manifests. The names, however, can be anything, they are user definable.

As indicated, the first of the two manifests (number 1026) is listed as having a total of "20" tapes and the second manifest (number 0656) is listed as having a total of "10" tapes. Furthermore, as illustrated by the number in the "seen" column, all tapes in each of these two manifests have been accounted for in the batches of tapes being brought through the Portal by the two operators.

In addition, one manifest row is titled "Free to Pass." The "Free to Pass" row lists "1" seen and "5" total. This means that five tapes or items (such as a case of tapes having one RFID tag associated with the case itself) currently in the library are currently not part of any manifest and are listed as items which can pass individually. Of those five tapes (or items), one is currently being brought through the Portal. The other four tapes are still in the library or may have been previously checked out.

Frame 232 on the screen is titled "Free to Pass 1." This means that "1" item stored in the library and which is not part of any manifest is within the interrogation zone. The system recognizes this one item as "Case10." "Case10" can be a cartridge tape or it can be a case of plural tapes, such as case 132, in FIG. 11, where the case 132 has an RFID tag on its lid. What matters is that the system is able to account for a tagged object that is not part of a manifest. Furthermore, the "5" free to pass can be five tapes or five cases of tapes, where only the cases have RFID tags.

It is to be appreciated that items may be not part of defined manifests and not listed as "Free to Pass". Such items are, for example, supposed to remain in the library until the Portal is programmed otherwise.

When accounting for tapes, the system can differentiate between RFID labeled tapes and traditionally labeled tapes, e.g., tapes with barcode labels which do not have RFID tags, so long as the tapes have been properly inventoried at the onset. If a manifest contains one or more barcode only labeled tapes, those tapes are automatically listed as being "seen" on the Manifest Itemization frame (230, FIG. 17). In addition, this allows an RFID labeled case (e.g., Case10 in FIG. 17, providing Case10 is a container of labeled cassettes) to contain barcode only tapes, pass through the Portal and receive a green light (e.g., a "pass").

Regarding the order of the list, it is determined by the order in which tags are seen and the manifest in which those tags belong. For example, the "Free to Pass" row is not listed between the other manifest items due to any dependent logic.

Furthermore, a frame 234 titled "Missing" identifies specific tapes missing from the predefined manifests based on the number of tapes in the interrogation zone during the time period calculated for the inventorying scan. No missing tapes are listed in this example.

A control area 235 is provided in the interface. The control area 235 includes a "Manifest Manager" button 236 and an "Inventory Tags" button 238. The "Manifest Manager" provides an interface to create, edit, etc., manifests. "Inventory Tags" allows new items (e.g., tape cartridges) to be put into the system so they can be tracked and become members of a manifest during a new tag inventorying step (see FIG. 13A, discussed above).

An "Override" button 240 is provided. This button enables an operator to override the system if, for example, a warning is listed due to a missing tape in a manifest, discussed further below. (Note, the duration for the override feature was defined in the "Portal Clear Time," discussed above (FIG. 13, item 178)). It is shaded, indicating that there is no reason in the current example to use the "Override" option.

A Portal "Status" frame 242 indicates that the Portal is "Running" in one of the defined inventorying scan modes (e.g., a "Step 2" (or higher) scan configuration). A Scan Status frame 244 reads "All Pass Clear Portal," indicating that the manifests related to the tapes in the interrogation zone have been accounted for via the listed batches.

It is possible that all tapes were found during a "Step 2" (or higher) scan period. However, "All Pass Clear Portal" indicates that at the scanning process ended with the Portal finding all tapes related to the relevant manifests in the interrogation zone.

Just as with the override option, the Portal ceases scanning for a duration defined by the Portal Clear Time (FIG. 13, item 178). At the end of "Clear Portal" timer the Portal reverts to the idle scan (Step 1) configuration to scan for new items in the interrogation zone.

The Scan Status frame 244 is capable of turning various colors to provide an additional visual confirmation of the scan status. For example, when the Scan Status frame 244 reads "All Pass Clear Portal", the color is green. Furthermore, the illuminating member 121 on top of the Portal is green at this time.

Figure 18:
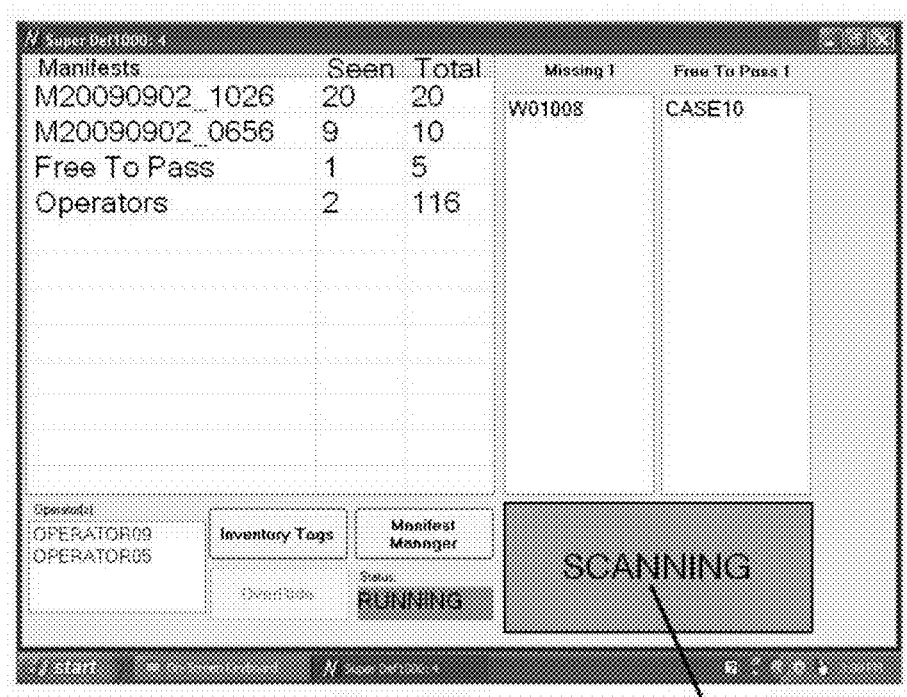
FIG. 18 illustrates another user interface for operating the Portal.

FIG. 18 is a Portal-side screenshot while scanning during the inventorying process. The figure illustrates a period when the contents of all manifests and RFID enabled items currently within the Portal interrogation zone are being scanned and interrogated during a "Step 3" (or higher, if defined) scanning period. For reasons which will become clear, the time period calculated for a "Step 2" scanning period has run out. During this subsequent scanning period, the Scan Status frame 244 lists "Scanning" and is colored yellow. Furthermore the illuminating member is yellow during this period.

The following is provided in the Manifest Inventory frame:

| Manifest | Seen | Total |
| --- | --- | --- |
| M20090902_1026 | 20 | 20 |
| M20090902_0656 | 9 | 10 |
| Free to Pass | 1 | 5 |
| Operators | 2 | 116 |

The above information is essentially the same as that provided in FIG. 17, except that the number of tapes identified as "Seen" with respect to manifest "0656" is "9" instead of "10". That is, to complete that manifest the batch of tapes in the interrogation zone requires an additional tape. This could mean that the missing tape was physically absent or its RFID tag is defective.

The "Missing" frame is now titled "Missing 1" and the single missing tape is listed, which is "W01009". "Free to Pass" is now listed below both lists manifests, meaning one of the "Free to Pass" items (e.g., tape; case) was seen last in order by the Portal. "Case10" is the item identified by the RFID tag in the "Free to Pass" list observed by the Portal.

It can be determined that the "Step 2" scanning period has ended because of the identified missing item. Such items are not listed until the "Step 2" scanning period has ended and the "Step 3" (or higher, if defined) scanning period has begun. In the "Step 3," for example, the power is turned up on the antenna and the system enters the "Single Tag Mode" (if so configured) to search for individual items which satisfy the identified manifests.

FIG. 19, similar to FIG. 18, is a screenshot of a situation in which all RFID items that were expected at the Portal, to complete the listed manifests, were not seen by the Portal. The difference between FIGS. 18 and 19 is that the time period for each defined and active inventorying scan has run out in FIG. 19.

This results in the Scan Status frame 244 reading "Fail Missing Tags." Further, the Scan Status frame 244 and the illuminating member 121 are both red. In FIG. 19, following is in the Manifest Inventory frame:

| Manifest | Seen | Total |
| --- | --- | --- |
| M20090902_1026 | 20 | 20 |
| Free to Pass | 1 | 5 |
| M20090902_0656 | 9 | 10 |
| Operators | 2 | 116 |

The above is the same as provided in FIG. 18, except that the "Free to Pass" row is now between the "1026" and "0656" rows, as it was with FIG. 17. Again, this is due to the order in which the tags are seen and the manifest in which the tags belong. In FIG. 19, the "Override" button is not shaded. This means that the operator, now that the "Missing Tag" fault has been recorded, has the option to use this feature of the software. Furthermore, as illustrated in FIG. 13, an alert would be emailed to the designated Portal Operator based on this "Missing Tag" triggering event.

Figure 20:
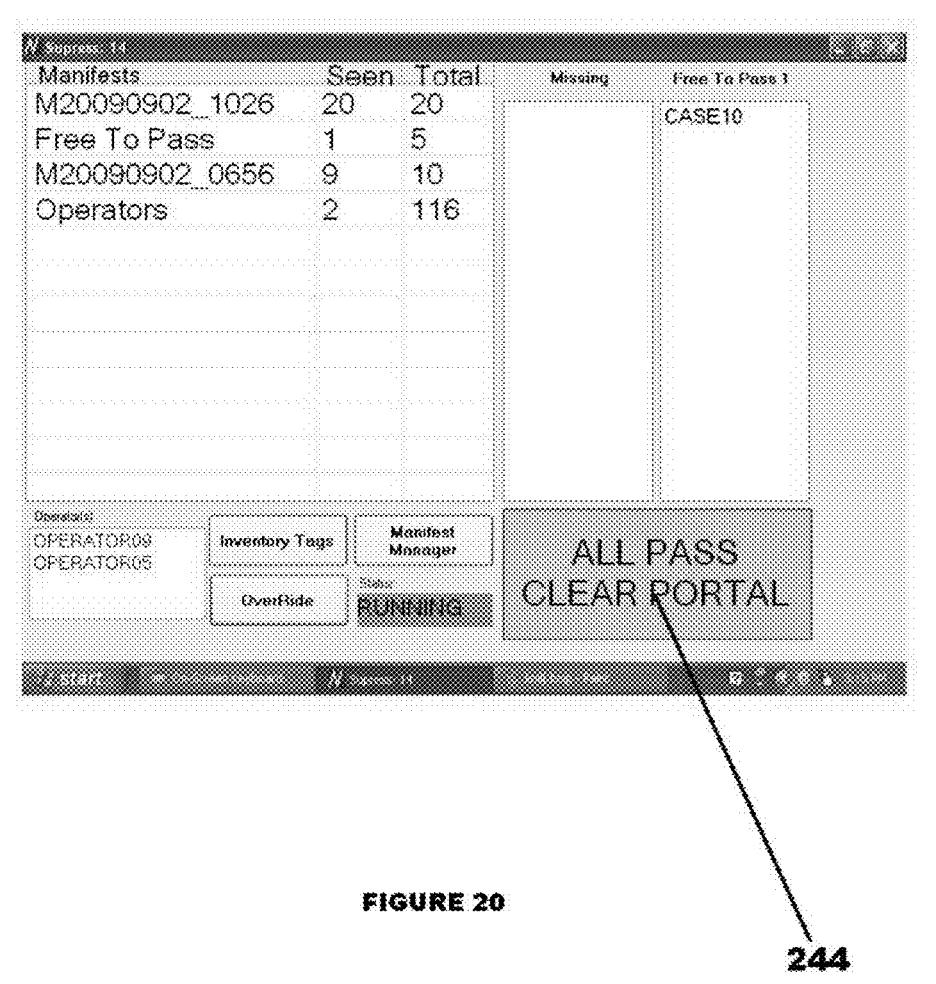

FIG. 20 is a screenshot which continues with the scenario of FIG. 19. In this, instance, the operator has actuated the "Override" button in order to continue with the scanning process even though one item has been listed as missing. This option would be engaged by the operator when, for example, upon inspection of the items, the operator determined that the item was present. This operation allows for, as an example, non-RFID enabled tapes to be tracked and recorded, e.g., by hand. If the operator finds in his proximity an RFID enabled cassette which was listed as missing, the appropriate step would be to utilize a hand scan option (discussed below), rather than the "Override" option.

By operation of the "Override" feature, the Scan Status frame 244 now reads "All Pass Clear Portal" despite the fact that manifest "0656" is one item short of being complete. The Clear Portal timer now counts down and the Portal then reverts to Step 1, idle scan conditions. Furthermore, the Scan Status frame 244 and illuminating member 121 are both green.

FIG. 21 is a screenshot of an example when an RFID enabled item was presented to the Portal that should not have been in the interrogation zone. The Manifest Itemization frame lists the following:

| Manifest | Seen | Total |
| --- | --- | --- |
| Free to Pass | 1 | 5 |
| M20090902_1026 | 19 | 20 |
| M20090902_0656 | 1 | 10 |

The Manifest Inventory list indicates that one tape is missing from the group of tapes under manifest M20090902_1026. This is because only "19" tapes from the defined manifest are seen, while "20" are expected to be seen to complete the manifest. Furthermore, the Manifest Inventory list indicates that one tape from manifest M20090902_1026, which itself expected to contain "10" tapes, is in the interrogation zone. This could happen when, e.g., the operator brings a batch of twenty tapes to the Portal, and, as indicated, one of the tapes belongs to the second manifest.

The "Free to Pass" frame lists "Case10." Also, the "Free to Pass" row is now above the two listed manifests, as the item identified as "Case10" (e.g., individual cartridge or a case 132), which is listed in the system as a "Free to Pass" item, was seen first during the inventorying scanning period. At the same time, manifest 1026 is missing a tape cartridge. The explanation for this row and frame information is the same as before.

Furthermore, the Scan Status frame 244 reads "Fail Rogue T00360". This means that tape number T00360 is in the Portal but it is not part of the listed manifests and not a Free to Pass item. Furthermore, the Scan Status frame 244 and illuminating member 121 are both red. As illustrated in FIG. 13, an alert would be emailed based on this "Rogue" tag triggering event.

During a three second "Step 1" (idle) scan, the system can determine that an item it sees is a Rogue tag. In this figure, the twenty or so tags within the interrogation zone could have been seen during the "Step 1" scan period. Thus, it can be deduced that the Rogue tag alert was triggered and the system entered the Clear Portal phase before having a chance to enter a "Step 2" scan.

Figure 22:
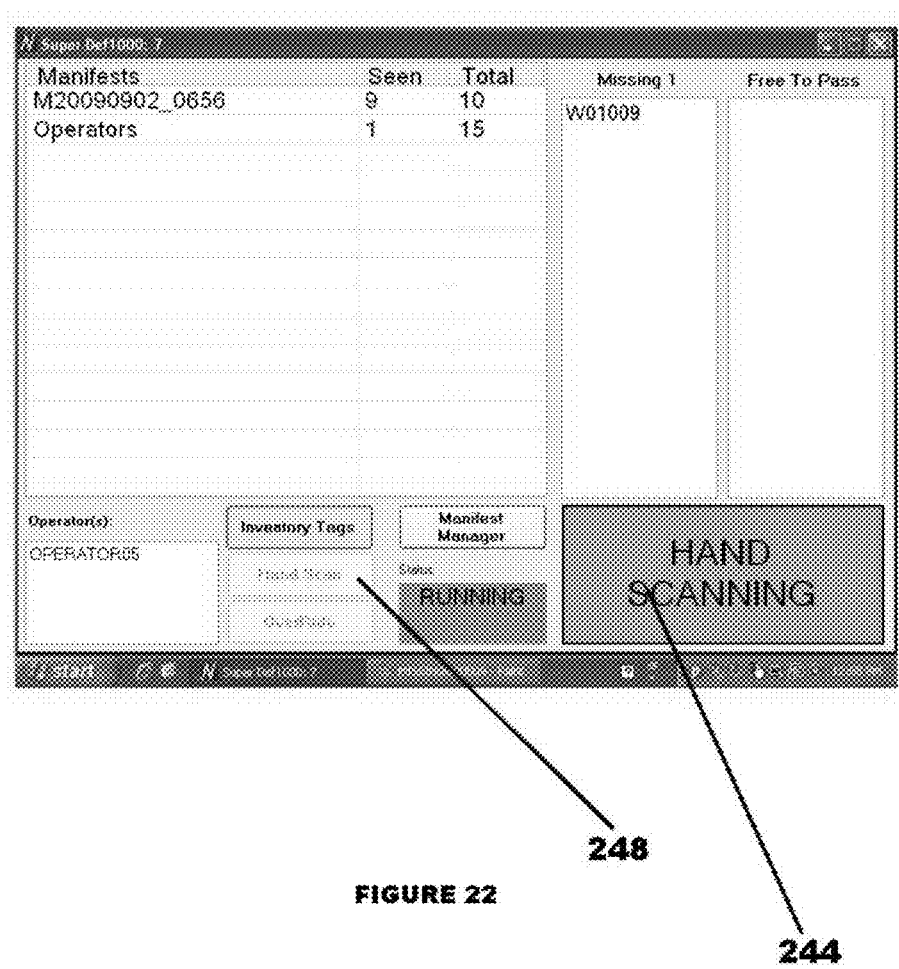
FIG. 22 illustrates another user interface for operating the Portal.

FIG. 22 is a screenshot of an example where only one operator, "Operator05" is present. Further, tapes from manifest "0656" have been seen, but no tapes from other manifests, such as "1026," and no "Free to Pass" or Rogue items have been seen.

In this example, manifest "0656" contains ten tapes, but the batch at the Portal only scans nine tapes. Once all automated scanning steps are complete, and a "Failed: Missing Tag" alert has posted, as with FIG. 19, the missing tape is listed as "W01009" in the "Missing" frame, which is now printed as "Missing 1".

At this time, while the "Clear Portal Timer" is running, if the Portal sees an operator tag, the Hand Scan button 248 is enabled. In the figure, the operator decides to use a hand scanner to correct the problem and the Hand Scan button 248 is grayed out. During this time, the wand antenna is used in an effort to scan the tapes in possession of the operator, to determine whether the missing tape is present. Furthermore, during this time, the "Hand Scanning" indicator is provided in the Scan Status frame 244. Furthermore, the Scan Status frame 244 and illuminating member 121 are both yellow.

The operation of the hand scanning period is also illustrated in FIG. 11. That is, a hand scan is being performed. This mode will either expire when time runs out (discussed in relation to FIG. 13, above) or all the tapes are seen. If not all tags are seen, the Portal will revert to "Failed: Missing Tag" as with FIG. 19. If all tags are seen, the portal will indicate "All Pass Clear Portal" as with FIG. 17. It can be repeated by pressing the hand scan button again if needed. If the missing tag is not found, the Portal Operator can activate the override option, as with FIG. 20.

Figure 23:
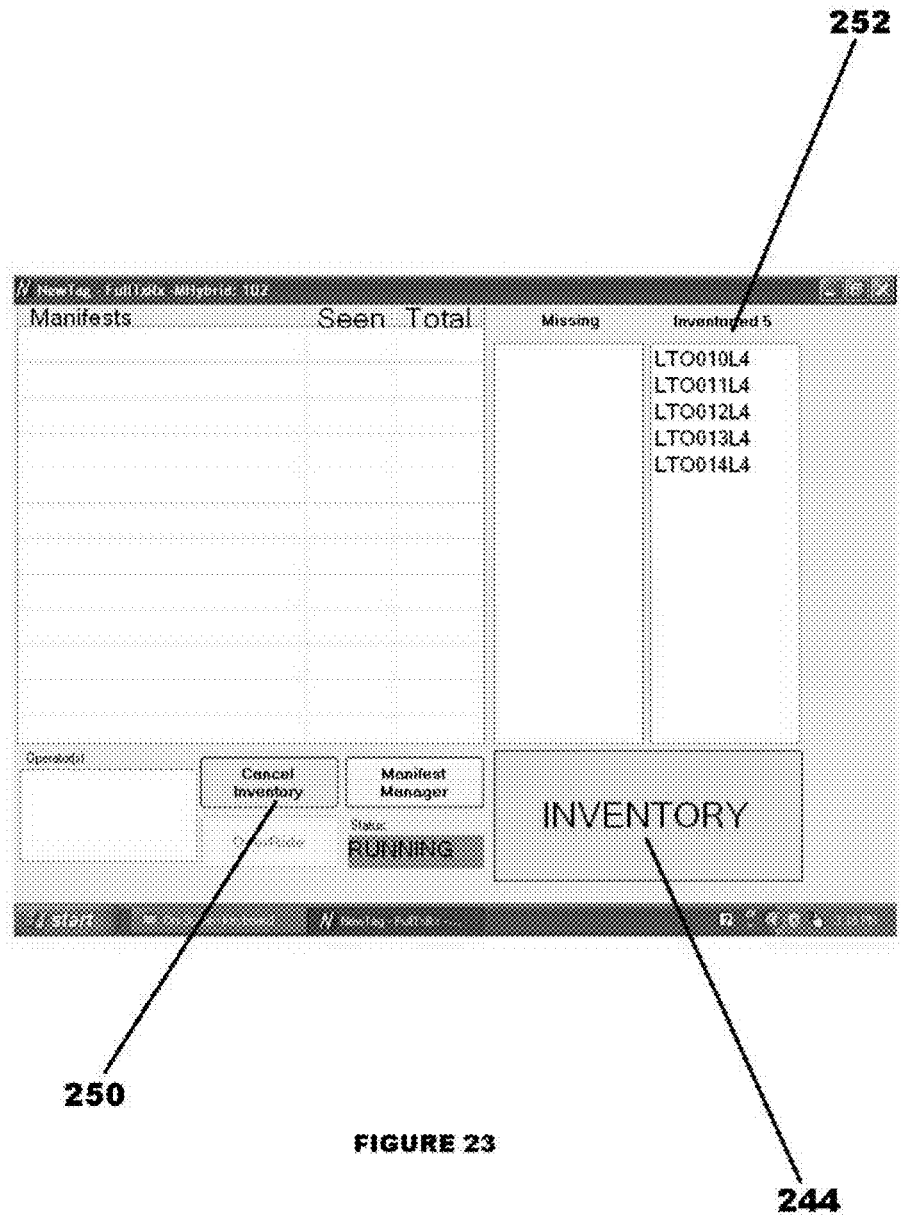
FIG. 23 illustrates another user interface for operating the Portal.

FIG. 23 illustrates a screenshot of when a Portal Operator is entering new RFID enabled tapes into system (new tag inventorying). During this process, the Portal runs the configuration defined in FIG. 13A. This is preferable because otherwise the system would be unable to scan for all items in a manifest.

This screen is obtained by engaging the "Inventory Tags" button, which is then replaced with a "Cancel Inventory" button 250. Engaging the "Cancel Inventory" cancels this operation. An operator may cancel this procedure if all new tags are inventoried before the time designated in FIG. 13A, or if this procedure was accidentally initiated. During a New Tag Inventory period, the Scan Stats frame 244 reads "Inventory." Furthermore, the Scan Status frame 244 is bright yellow during this period. The illuminating member 121 is also yellow, which indicates a "busy" state.

During the New Tag Inventory period, the "Free to Pass" frame is replaced with an "Inventoried" frame 252. The title reads "Inventoried 5," indicating that five new tapes have been inventoried. Those newly inventoried include LTO-010-L4 to LTO-014-L4 [hyphens added], where those identifiers have been recorded from the five different IC chips on the respective tapes as disclosed, above. Once inventoried, new tags maybe added to a predefined or new manifest, at the server or at the portal.

Figure 24:
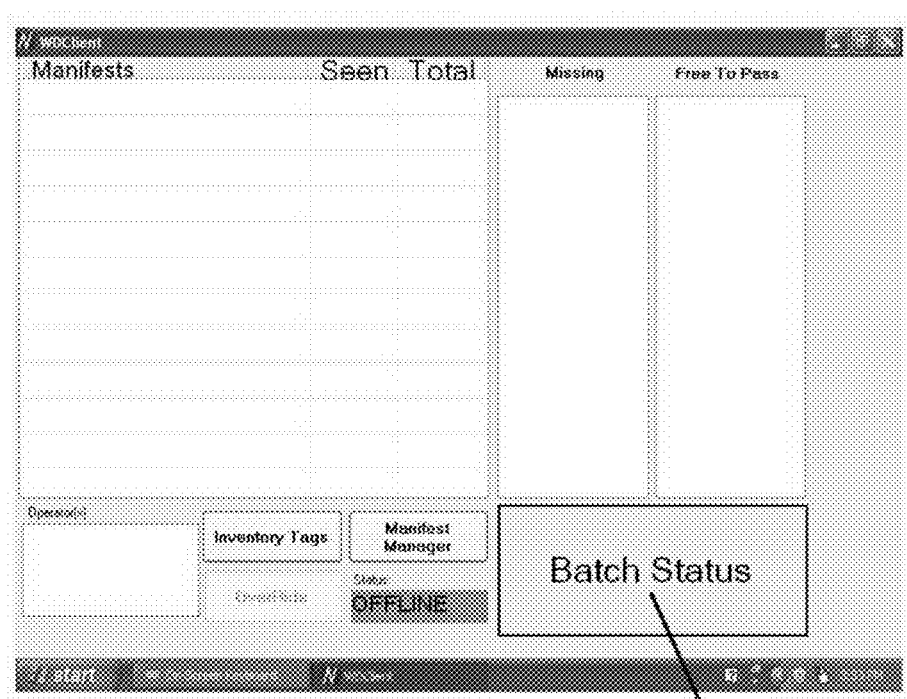
FIG. 24 illustrates another user interface for operating the Portal.

FIG. 24 is a screenshot of the Portal in an offline state. Specifically, the Portal Status indicator reads "Offline" and the Scan Status frame 244, with a grayed font, reads "Offline". Going offline is a triggering event, listed in FIG. 13 (Portal Monitor Stop or Connect Fail), for which an email is sent to the Portal Operator.

Figure 25:
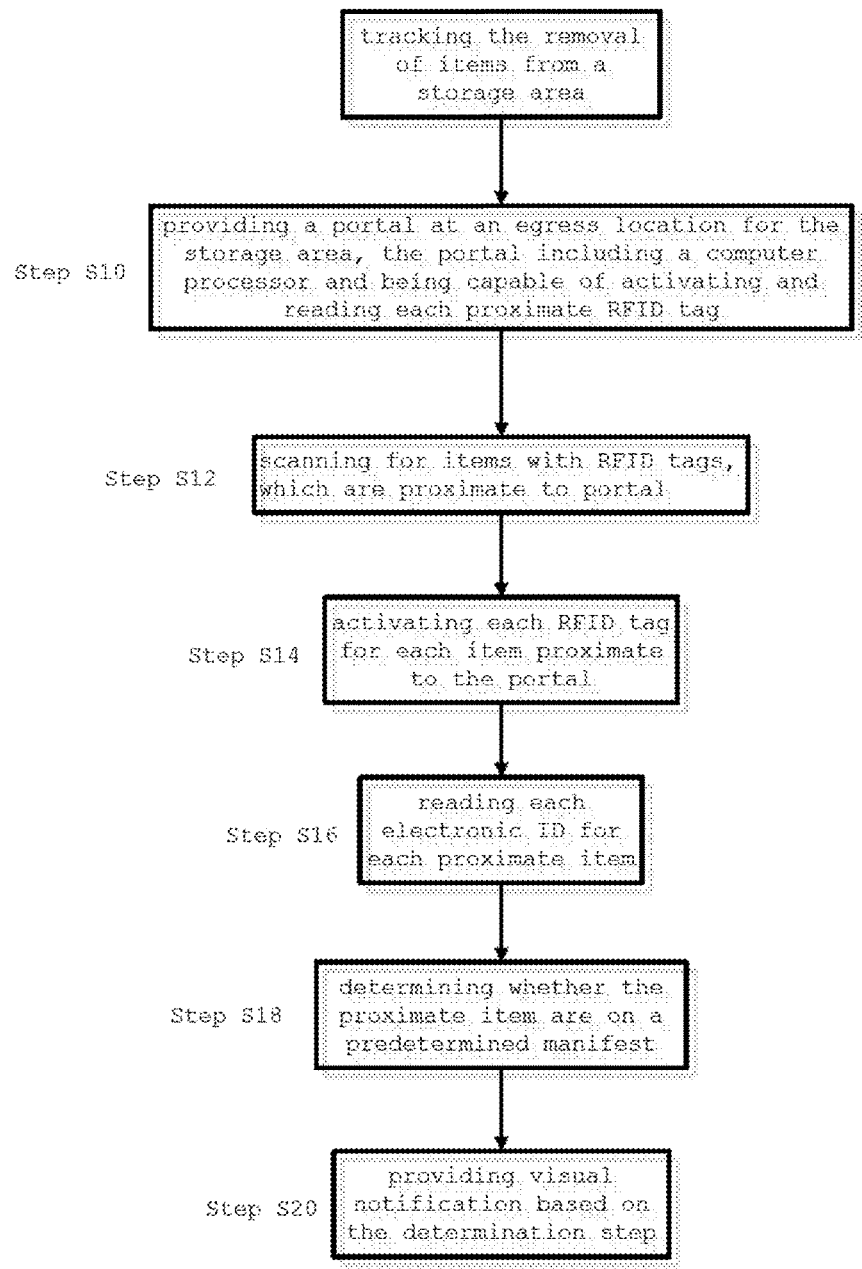
FIG. 25 illustrates a flowchart for the operation of the Portal.

Having described the system and process above, flowcharts will now be provided disclosing the process of tracking the removal of items from a storage area according to a disclosed embodiment. Specifically, as illustrated in FIG. 25, the process is directed to Step S10 of providing a Portal at an egress location for the storage area, the Portal including a computer processor and being capable of activating and reading each proximate RFID tag.

The Portal is capable of performing Step S12 of scanning for items with RFID tags, which are proximate to the Portal. The Portal is also capable of performing Step S14 of activating each RFID tag for each item proximate to the Portal. Further, the Portal is capable of performing Step S16 of reading each electronic ID for each proximate item. The Portal is also capable of performing Step S18 of determining whether the proximate items are on a predetermined manifest. Moreover, the Portal is capable of performing Step S20 of providing visual notification based on the determination step.

Figure 26:
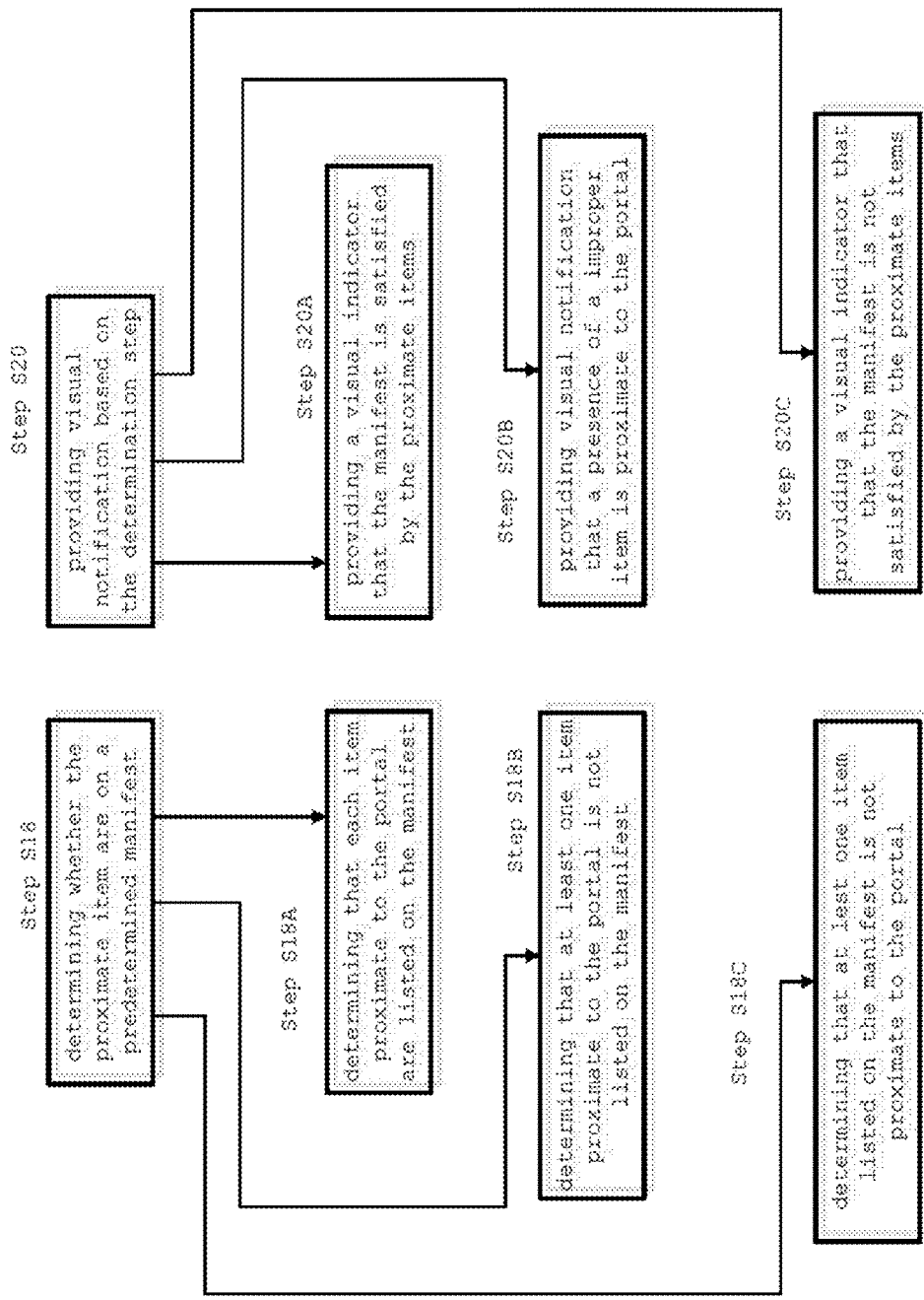
FIG. 26 illustrates another flowchart for the operation of the Portal.

As illustrated in FIG. 26, the determining step, Step S18 includes Step S18A of determining that each item proximate to the Portal is listed on the manifest. In a corresponding step, the notifying step, Step S20, includes Step S20A of providing a visual indicator that the manifest is satisfied by the proximate items.

As an alternative, the determining step, Step S18 includes Step S18B of determining that at least one item proximate to the Portal is not listed on the manifest. In the corresponding step, the notifying step, Step S20, includes Step S20B of providing visual notification that a presence of an improper item is proximate to the Portal.

As another alternative, the determining step, Step S18 includes Step S18C of determining that at least one item listed on the manifest is not proximate to the Portal. In the corresponding step, the notifying step, Step S20, includes Step S20C of providing a visual indicator that that the manifest is not satisfied by the proximate items.

Figure 27:
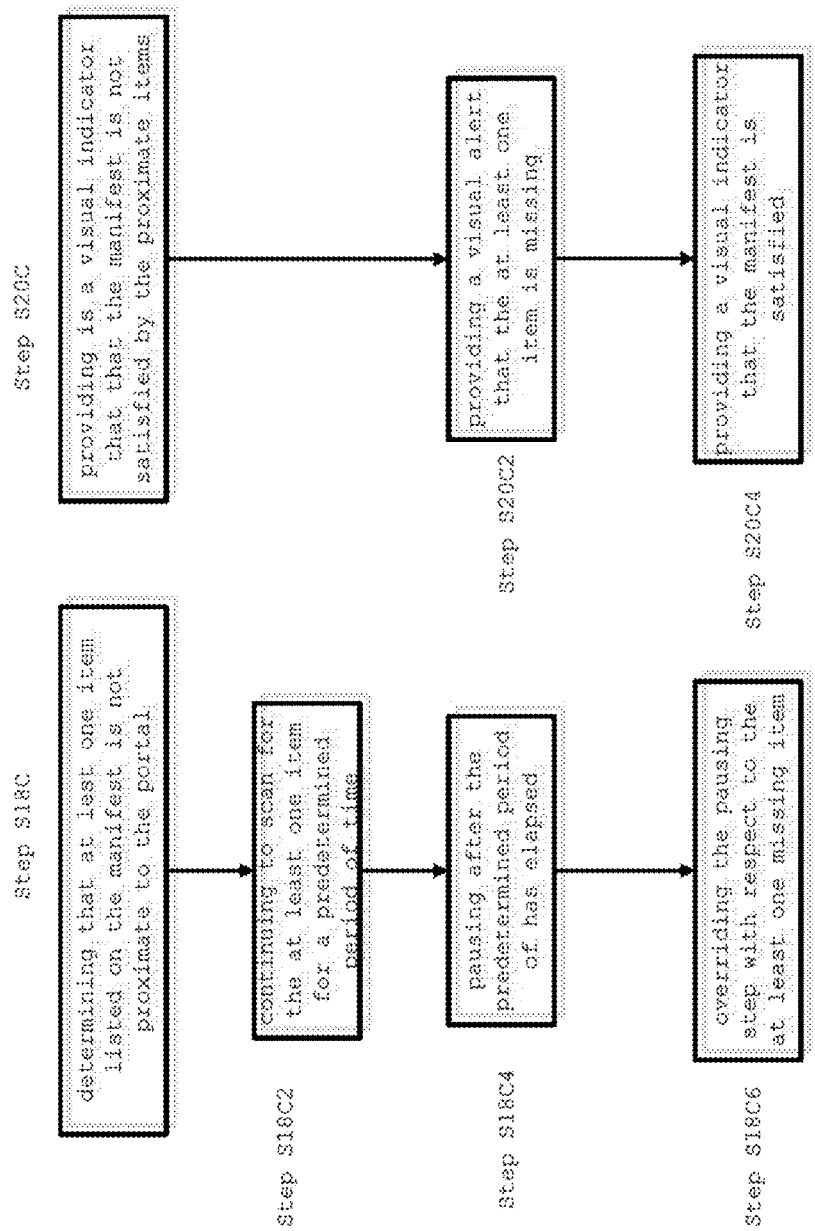
FIG. 27 illustrates another flowchart for the operation of the Portal.

As illustrated in FIG. 27, Step S18C of determining that at least one item listed on the manifest is not proximate to the Portal, further includes the Step S18C2 of continuing to scan for the at least one item for a predetermined period of time. Step S18C further includes Step S18C4 of pausing after the predetermined period of has elapsed. In a corresponding step, Step S20C of providing the visual indicator that that the manifest is not satisfied by the proximate items, includes Step S20C2 of providing a visual alert that the at least one item is missing.

On option at this point, after the system has paused, as indicated at the bottom of FIG. 27, is Step S18C6 of overriding the pausing step with respect to the at least one missing item. A corresponding notification step, Step S20C4, is providing a visual indicator that the manifest is satisfied.

Figure 28:
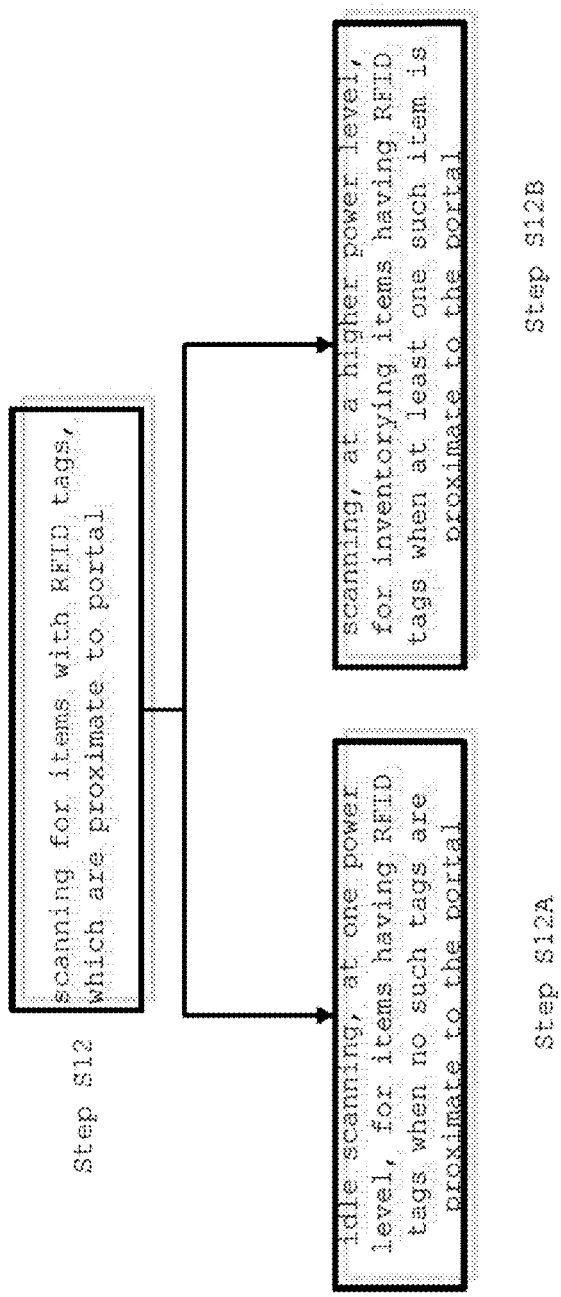
FIG. 28 illustrates another flowchart for the operation of the Portal.
Figure 29:
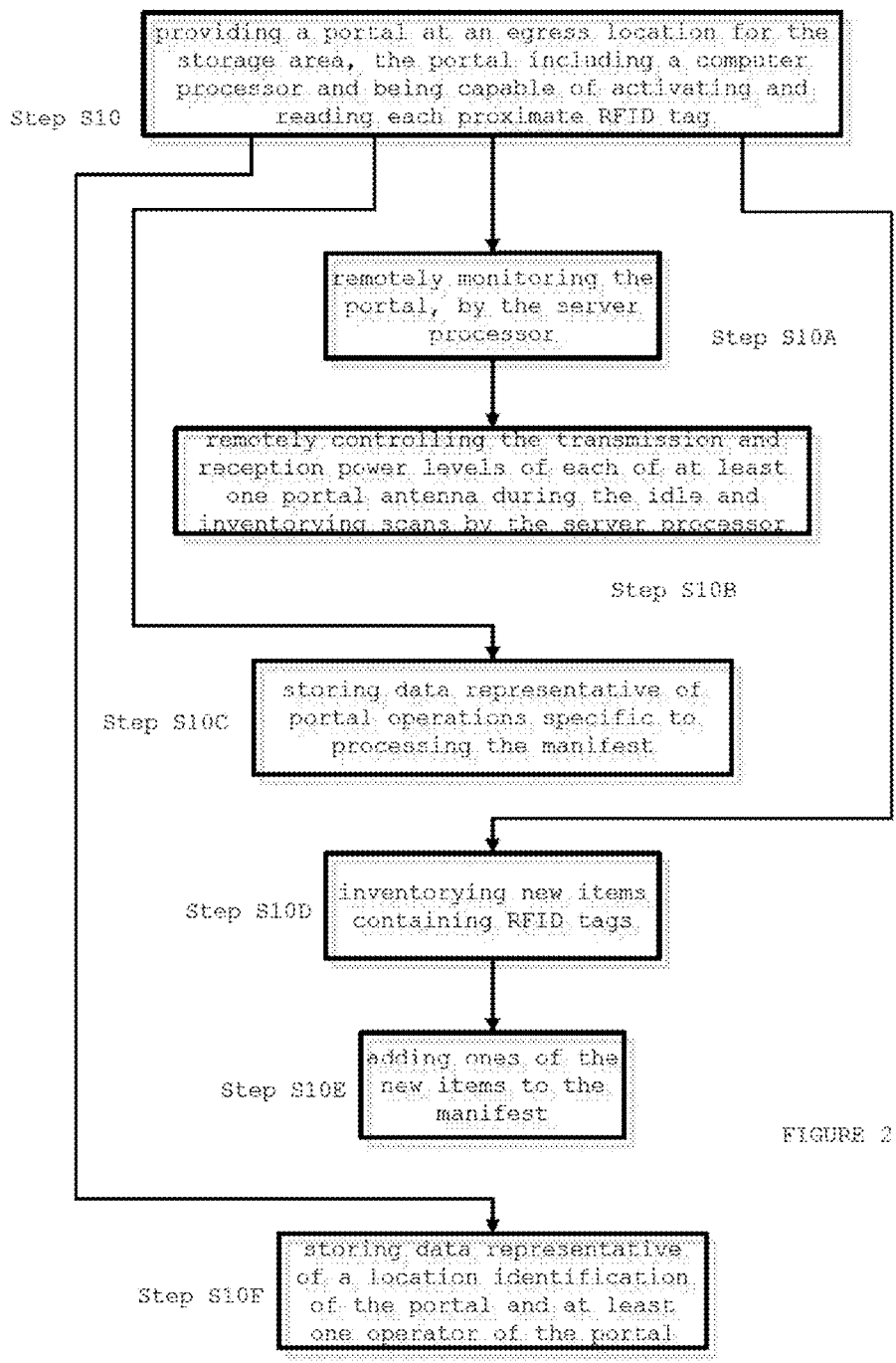
FIG. 29 illustrates another flowchart for the operation of the Portal.

As illustrated in FIG. 28, the scanning step, Step S12, is performed by Step S12A of idle scanning, at one power level, for items having RFID tags, when no such tags are proximate to the Portal. Step S12 is also performed by Step S12B of scanning, at a higher power level, for items having RFID tags, when at least one such item is proximate to the Portal.

Regarding Step S10 of providing the Portal at the egress location, this step comprises various steps. Step S10A is remotely monitoring the Portal, by the server processor and Step S10B is remotely controlling the transmission and reception power levels of each of the at least one antennas during the idle and inventorying scans by the server processor.

Step S10 optionally includes Step S10C of storing data, by the remote processor, representative of Portal operations specific to processing the manifest.

Step S10 also optionally includes Step S10D of inventorying new items containing RFID tags and Step S10E of adding ones of the new items to the manifest via the remote processor or Portal. Further, Step S10 optionally includes Step S10F of storing data, by the remote processor, representative of a location identification of the Portal and at least one operator of the Portal.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

We claim:

1. A method for tracking the removal of items from a storage area;
    substantially each item within said storage area including an RFID tag or being part of a manifest of items containing at least one item that includes an RFID tag;
    each RFID tag containing a programmable electronic ID specific to the entity utilizing the storage area for identifying each respective item, said method comprising the step of:
    providing at least one Portal for passing at a fixed egress location for said storage area, said Portal including at least one RF antenna for increasing the RF signal of each RFID tag, a computer processor being capable of activating each RFID tag and a RF reader capable of reading each RFID tag;
    and wherein the at least one Portal is adapted and configured with varying degrees of power levels; said power levels corresponding to whether an item is being brought in or out of the storage area;
    said at least one Portal performing the steps of:
    i. scanning for items with RFID tags, which are proximate to the at least one Portal;
    ii. activating each RFID tag for each item proximate to said at least one Portal;
    iii. reading each electronic ID for each proximate item;
    iv. determining whether said proximate item are on a predetermined manifest;
    v. providing a visual indicator on the at least one Portal or an electronic communication based on said determination step;
    vi. wherein the lower power level is only capable of reading RFID tags which are passed through the Portal, and;
    vii. wherein the higher power level is capable of reading RFID tags positioned on one side of the portal in addition to reading RFID tags which are passed through the Portal.

2. The method of claim 1, wherein said at least one Portal includes:
    at least one RF antenna for increasing the RF signal to power each tag in each proximate item;
    an RF reader for communicating with each tag and reading each electronic ID for each proximate item; and
    said RF reader and at least one antenna being controlled by said computer processor in the at least one Portal.

3. The method of claim 2, wherein said scanning step comprises the steps of:
    idle scanning, at one power level, for items having RFID tags, when no such tags are proximate to said at least one Portal; and
    scanning at a higher power level, for inventorying items having RFID tags, when at least one such item is proximate to said at least one Portal.

4. The method of claim 2, wherein said at least one Portal includes a monitor, controlled by said computer processor, for providing said visual indicators.

5. The method of claim 2, wherein said at least one Portal includes plural colored illuminating members, controlled by said computer processor, for providing said visual indicator.

6. The method of claim 5, wherein said plural colored illuminating members include:
    a yellow member which is illuminated while determining whether said proximate items are on a predetermined manifest;
    a green member which is illuminated upon determining that said manifest is satisfied by said proximate items; and
    a red member which is illuminated upon determining that said manifest is not satisfied by said proximate items or that an improper item is proximate to said at least one Portal.

7. The method of claim 3, wherein said at least one Portal comprises one Portal or two Portals spaced from each other about said egress location; and said one or two Portals each including at least one RF antenna controlled by said computer processor.

8. The method of claim 7, wherein the at least one Portal includes a plurality of antennas, wherein at least one of said antennas is a removable antenna which is capable of operating as a handheld antenna.

9. The method of claim 8, wherein at least one of said antennas is contained in the at least one Portal is angled downwardly, towards an area in which said proximate items are positioned for interrogation.

10. The method of claim 9, wherein each antenna in the at least one Portal is at a mutually unique height location such to create an adjustable zone in which the RFID tag is scanned.

11. The method of claim 9, wherein said computer processor in said at least one Portal operates client software, said client software communicates with server software located on a processor located at a remote location.

12. The method of claim 11, wherein said step of providing the at least one Portal at the egress location comprises the steps of:
    remotely monitoring said at least one Portal, by said server processor; and
    remotely activating and deactivating said at least one Portal by said server processor.

13. The method of claim 12, wherein said step of providing the at least one Portal at the egress location comprises the steps of:
    remotely configuring plural modes for said at least one Portal antenna by said server processor; wherein at least one mode represents an idle scan mode and at least one mode represents an inventorying scan mode, wherein said antenna are capable of having differing power levels during each mode.

14. The method of claim 13, wherein at least one mode represents a new item inventorying scan mode.

15. The method of claim 14, wherein said step of providing the at least one Portal at the egress location comprises:
    inventorying new items containing RFID tags; and
    adding ones of said new items to a manifest.

16. The method of claim 15, wherein said step of providing the at least one Portal at the egress location comprises:
    storing data by said remote processor representative of:
    a location identification of said at least one Portal; and
    at least one operator of said at least one Portal.

17. The method of claim 16, wherein said step of providing the at least one Portal at the egress location comprises:
    identifying one or more triggering events for which said at least one Portal contacts said operator via said electronic communication.

18. The method of claim 17, wherein said step of providing the at least one Portal at the egress location comprises:
    remotely configuring said at least one Portal for when said removable antenna is operating as a removable antenna or as a stationary antenna.

19. The method of claim 1, wherein said programmable electronic ID comprises identifying information including at least one of the organization, technology, version of the item, electronic product code, location of the item and user.

20. The method of claim 1, wherein said items include items with secure data.

* * * * *